United States Patent
Yoshida et al.

(10) Patent No.: US 10,120,248 B2
(45) Date of Patent: Nov. 6, 2018

(54) LIQUID CRYSTAL DISPLAY DEVICE INCLUDING TRUNK LINES

(71) Applicant: Sharp Kabushiki Kaisha, Osaka-shi, Osaka (JP)

(72) Inventors: Masahiro Yoshida, Osaka (JP); Isao Ogasawara, Osaka (JP); Satoshi Horiuchi, Osaka (JP); Takaharu Yamada, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 14/988,801

(22) Filed: Jan. 6, 2016

(65) Prior Publication Data

US 2016/0131933 A1    May 12, 2016

Related U.S. Application Data

(63) Continuation of application No. 13/512,350, filed as application No. PCT/JP2010/063475 on Aug. 9, 2010, now Pat. No. 9,261,741.

(30) Foreign Application Priority Data

Dec. 4, 2009  (JP) ................. 2009-276235

(51) Int. Cl.
  *G02F 1/1345* (2006.01)
  *G02F 1/1339* (2006.01)
  *G02F 1/1362* (2006.01)

(52) U.S. Cl.
  CPC ........ *G02F 1/13454* (2013.01); *G02F 1/1339* (2013.01); *G02F 1/1345* (2013.01); *G02F 1/136213* (2013.01); *G02F 1/136286* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 2003/0063248 A1* | 4/2003 | Komeno | ............... | G02F 1/1345 349/149 |
| 2003/0128326 A1* | 7/2003 | Yamaguchi | ......... | G02F 1/13452 349/152 |
| 2003/0202151 A1* | 10/2003 | Hinata | ............. | G02F 1/133555 349/149 |
| 2007/0165149 A1* | 7/2007 | Kim, II | ............. | G02F 1/134336 349/39 |

(Continued)

OTHER PUBLICATIONS

Yoshida et al., "Liquid Crystal Display Device Including Trunk Lines", U.S. Appl. No. 13/512,350, filed May 29, 2012.

*Primary Examiner* — Lauren Nguyen
(74) *Attorney, Agent, or Firm* — Keating & Bennett, LLP

(57) ABSTRACT

In the present liquid crystal display device, a conventional first auxiliary capacitance trunk line 430 is formed to be narrow, and a second auxiliary capacitance trunk line 440 is additionally provided and disposed at the closest position to the periphery of a substrate. Thus, a shift register can be distanced from the periphery of the substrate without increasing a frame area as a whole, so that the shift register is not overlaid with a seal material. Moreover, the extent of an area overlaid with a seal material within a wiring area for providing signals to the shift register can be reduced.

19 Claims, 14 Drawing Sheets

(56) References Cited

U.S. PATENT DOCUMENTS

| | | | |
|---|---|---|---|
| 2008/0316416 A1* | 12/2008 | Chang | G02F 1/13452 349/150 |
| 2009/0231532 A1* | 9/2009 | Yoshida | G02F 1/1345 349/151 |
| 2010/0053127 A1* | 3/2010 | Takenaka | G02F 1/13452 345/204 |

* cited by examiner

LIQUID CRYSTAL DISPLAY DEVICE INCLUDING TRUNK LINES

TECHNICAL FIELD

The present invention relates to active-matrix liquid crystal display devices, specifically to a layout of a shift register, which is included in a scanning signal line driver circuit, and various wiring lines provided in a liquid crystal display device.

BACKGROUND ART

Conventionally, there are known active-matrix display devices in which a plurality of gate bus lines (scanning signal lines) and a plurality of source bus lines (video signal lines) are arranged in a grid pattern, and a plurality of pixel formation portions are arranged in a matrix so as to correspond to their respective intersections of the gate bus lines and the source bus lines. Each of the pixel formation portions includes a TFT (thin-film transistor), which is a switching element having a gate terminal connected to a gate bus line passing through its corresponding intersection and a source terminal connected to a source bus line passing through the intersection, and also includes a pixel capacitance for holding a pixel value. Such an active-matrix display device is also provided with a gate driver (scanning signal line driver circuit) for driving the gate bus lines and a source driver (video signal line driver circuit) for driving the source bus lines.

Video signals, each indicating a pixel value, are transmitted by the source bus lines, but it is not possible for the source bus lines to concurrently (simultaneously) transmit video signals that indicate pixel values for a plurality of rows. Accordingly, video signals are sequentially written to the pixel capacitances in the pixel formation portions arranged in a matrix, on a row-by-row basis. Therefore, the gate driver includes a multiple-stage shift register such that the gate bus lines are each sequentially selected for a predetermined period. This shift register circuit is integrally formed on a substrate (where the TFTs are formed), and such a configuration is called a monolithic gate driver.

In this monolithic-gate-driver display panel, clock signals required for operating the shift register are provided to stages of the shift register through wiring lines arranged outside the periphery of the panel for the purpose of supplying signals to the driver circuit. The clock signals should normally be provided to TFTs included in the shift register, and therefore, an area for laying out the shift register is required to stretch out from where the wiring lines for supplying the driver circuit with signals are arranged to where the pixel formation portions are arranged. This is one of the factors that increase the extent of a shift register layout area, and in particular, any display device with a shift register operating on the basis of a number of clock signals tends to have a large shift register layout area.

Furthermore, in general active-matrix liquid crystal display devices, auxiliary capacitance lines are provided in parallel with gate bus lines, forming auxiliary capacitances through capacitive coupling with pixel electrodes. In addition, an auxiliary capacitance trunk line is provided in a frame area for the purpose of providing a common potential to the auxiliary capacitance lines. The auxiliary capacitance trunk line has the auxiliary capacitance lines commonly connected thereto, and therefore, in general, it is often the case that the auxiliary capacitance trunk line is provided in the frame area between the gate driver and the display area.

In this regard, Japanese Laid-Open Patent Publication No. 2007-10900 discloses a configuration in which auxiliary capacitance lines are connected to a source signal line of a scanning signal line driver circuit via a shared line equivalent to the auxiliary capacitance trunk line. Moreover, Japanese Laid-Open Patent Publication No. 10-48663 discloses a configuration in which first and second auxiliary capacitance lines are connected to a source voltage line and a ground voltage line, respectively, of a scanning signal line driver circuit. With this configuration, auxiliary capacitance resistance is reduced, and the operation of the driver circuit is stabilized.

CITATION LIST

Patent Document

Patent Document 1: Japanese Laid-Open Patent Publication No. 2007-10900
Patent Document 2: Japanese Laid-Open Patent Publication No. 10-48663

SUMMARY OF THE INVENTION

Problems to be Solved by the Invention

Incidentally, the frame area is covered (overlaid), but not entirely, with a seal material for a liquid crystal panel, and in the case where a shift register with a large layout area is provided, the shift register is often overlaid in part with the rest not being overlaid. In such a case, if the width of the seal material is inconsistent, the range overlaid with the seal material varies among bistable circuits included in stages of the shift register (and connected to scanning signal lines), so that the range overlaid with a liquid crystal sealed within (inside) the range not overlaid with the seal material varies as well. Consequently, circuits are affected by capacitance values, which vary from one circuit to another, and the circuits vary in terms of their output signals, which might result in different pixel luminances and flickering.

Furthermore, a trunk line and branch lines for providing clock signals, etc., to the circuits of the shift register are required to be provided in an area between the edge of the liquid crystal panel and the shift register. Here, in the case where ITO (indium tin oxide) or suchlike, of which pixel electrodes are composed, is used to connect the trunk line and the branch lines, ITO is exposed at contact holes, which are connecting points. When a spacer material (e.g., fiberglass or suchlike) mixed in the seal material contacts ITO, a partial break or disconnection might occur, resulting in increased resistance, disconnection, etc., at the connecting points.

Therefore, it is preferable that the circuits of the shift register not be overlaid with the seal material at all, and the contact holes not be overlaid with the seal material at all or the number of contact holes overlaid be as small as possible.

In this regard, the aforementioned problems can be completely solved by providing an area (to be used as an attaching margin) for the seal material outside the area where wiring lines and circuits are formed. However, such a configuration increases the frame area, making it impossible to achieve a liquid crystal panel with a narrow frame.

Therefore, an objective of the present invention is to provide a liquid crystal display device in which the extent of an area overlaid with a seal material within a wiring area for providing signals to a shift register can be reduced without increasing a frame area and overlaying the shift register with the seal material.

Solution to the Problems

A first aspect of the present invention is directed to an active-matrix liquid crystal display device comprising a first substrate including a display area on which a plurality of pixel formation portions for forming an image to be displayed are arranged in a matrix, a second substrate opposed to the first substrate, and a liquid crystal layer sealed between the first and second substrates by a predetermined seal material, wherein,
the first substrate includes:
a plurality of video signal lines for transmitting signals to represent the image to be displayed;
a plurality of scanning signal lines crossing the video signal lines;
a plurality of auxiliary lines provided so as to extend in parallel with the scanning signal lines;
an auxiliary trunk line provided so as to extend in an arrangement direction of the auxiliary lines and electrically connect to the auxiliary lines; and
a scanning signal line driver circuit including a group of circuits for selectively driving the scanning signal lines, and
at least a part of the auxiliary trunk line includes trunk lines provided between the scanning signal line driver circuit and an edge of the first substrate that is opposite to the display area with respect to the scanning signal line driver circuit.

In a second aspect of the present invention, based on the first aspect of the invention, the auxiliary trunk line includes:
a first auxiliary trunk line provided between the scanning signal line driver circuit and the display area; and
a second auxiliary trunk line provided between the scanning signal line driver circuit and the edge of the first substrate that is opposite to the display area with respect to the scanning signal line driver circuit.

In a third aspect of the present invention, based on the second aspect of the invention, further comprised is a drive-signal-supply trunk line for transmitting a drive signal to drive the scanning signal line driver circuit, the drive-signal-supply trunk line being provided so as to extend in the arrangement direction between the second auxiliary trunk line and the scanning signal line driver circuit, wherein,
the seal material is disposed stretching from near the edge of the first substrate to a predetermined position on the drive-signal-supply trunk line.

In a fourth aspect of the present invention, based on the third aspect of the invention, further comprised are a plurality of drive-signal-supply branch lines connected to the drive-signal-supply trunk line via contact holes, thereby connecting the drive-signal-supply trunk line to the group of circuits, wherein,
the seal material is disposed stretching from near the edge of the first substrate to the predetermined position over a part of the contact holes.

In a fifth aspect of the present invention, based on the fourth aspect of the invention, the contact holes connect the drive-signal-supply trunk line and the drive-signal-supply branch lines by the same material as pixel electrodes provided in the pixel formation portions.

In a sixth aspect of the present invention, based on any of the second through fifth aspects of the invention, the second auxiliary trunk line is wider than the first auxiliary trunk line.

In a seventh aspect of the present invention, based on the second aspect of the invention, the first auxiliary trunk line is made of the same material as the second auxiliary trunk line.

In an eighth aspect of the present invention, based on the second aspect of the invention, further comprised are a plurality of auxiliary branch lines between the first and second auxiliary trunk lines, the auxiliary branch lines connecting the first and second auxiliary trunk lines, wherein,
the auxiliary branch lines are disposed at approximately equal intervals in the arrangement direction such that each auxiliary branch line passes between two circuits adjacent in the arrangement direction within the group of circuits.

In a ninth aspect of the present invention, based on the eighth aspect of the invention, the auxiliary branch lines are disposed so as to pass between all circuits adjacently paired in the arrangement direction within the group of circuits.

In a tenth aspect of the present invention, based on the second aspect of the invention, further comprised are:
a plurality of auxiliary branch lines between the first and second auxiliary trunk lines, the auxiliary branch lines connecting the first and second auxiliary trunk lines; and
intercircuit lines each connecting two different circuits positioned in the arrangement direction within the group of circuits, wherein,
the intercircuit lines are formed so as to be narrowed near their intersections with the auxiliary branch lines.

In an eleventh aspect of the present invention, based on the tenth aspect of the invention, the auxiliary branch lines are formed so as to be narrowed near their intersections with the intercircuit lines.

In a twelfth aspect of the present invention, based on the second aspect of the invention, further comprised is an end auxiliary line for connecting the first and second auxiliary trunk lines, the end auxiliary line being disposed around the scanning signal line driver circuit either between one end of the first auxiliary trunk line and one end of the second auxiliary trunk line or between the other end of the first auxiliary trunk line and the other end of the second auxiliary trunk line, or both.

In a thirteenth aspect of the present invention, based on the second aspect of the invention, the scanning signal line driver circuit includes a first group of circuits for selectively driving the scanning signal lines from one side, and a second group of circuits for selectively driving the scanning signal lines from the other side, the first auxiliary trunk line is disposed between the first or second group of circuits and the display area, and the second auxiliary trunk line is disposed between the first or second group of circuits and an edge of the first substrate that is opposite to the display area with respect to the first or second group of circuits.

In a fourteenth aspect of the present invention, based on the thirteenth aspect of the invention, further comprised are a plurality of auxiliary branch lines between the first and second auxiliary trunk lines disposed on said one or the other side, the auxiliary branch lines connecting the first and second auxiliary trunk lines, wherein,
each of the auxiliary branch lines passes between two circuits adjacent in the arrangement direction within the group of circuits, such that the auxiliary branch lines on said one side and the auxiliary branch lines on the other side are positioned so as to alternate in the arrangement direction.

In a fifteenth aspect of the present invention, based on the thirteenth aspect of the invention, further comprised is an end auxiliary line for connecting second auxiliary trunk lines disposed on said one and the other sides, the end auxiliary line being disposed either between one end of the second auxiliary trunk line on said one side and one end of the second auxiliary trunk line on the other side or between the other end of the second auxiliary trunk line on said one side and the other end of the second auxiliary trunk line on the other side, or both.

In a sixteenth aspect of the present invention, based on the second aspect of the invention, the second auxiliary trunk line has a plurality of openings.

In a seventeenth aspect of the present invention, based on the third aspect of the invention, the drive-signal-supply trunk line includes a plurality of wiring lines, and the widest of the wiring lines on which the seal material is disposed has a plurality of openings.

In an eighteenth aspect of the present invention, based on the second aspect of the invention, the auxiliary lines are of a plurality of types to be driven so as to be set at different potentials, the first auxiliary trunk line is provided in plurality in accordance with the types, and the second auxiliary trunk line is provided in plurality in accordance with the types.

Effect of the Invention

According to the first aspect of the present invention, the auxiliary trunk line is disposed between the edge of the first substrate and the scanning signal line driver circuit, so that an appropriate margin from the edge of the first substrate can be achieved without increasing a frame area, making it possible to reduce the extent of an area overlaid with a seal material in the wiring for providing signals to the scanning signal line driver circuit without overlaying the scanning signal line driver circuit with the seal material. In addition, a large capacitance (formed by the auxiliary trunk line) can be positioned between the scanning signal line driver circuit and the edge of the substrate, and therefore, the circuit can be protected from electrostatic discharge which takes place outside the substrate.

According to the second aspect of the present invention, the second auxiliary trunk line is provided between the edge of the first substrate and the scanning signal line driver circuit, independently of the first auxiliary trunk line, so that the first auxiliary trunk line can be formed to be narrow. Accordingly, an appropriate margin from the edge of the first substrate can be achieved without increasing the load on the auxiliary trunk line or increasing the frame area, making it possible to reduce the extent of an area overlaid with a seal material in the wiring for providing signals to the scanning signal line driver circuit without overlaying the scanning signal line driver circuit with the seal material. In addition, a large capacitance (formed by the second auxiliary trunk line) can be positioned between the scanning signal line driver circuit and the edge of the substrate, and therefore, the circuit can be protected from electrostatic discharge which takes place outside the substrate.

According to the third aspect of the present invention, the drive-signal-supply trunk line is further provided between the auxiliary trunk line and the scanning signal line driver circuit, and the seal material is disposed stretching from near the edge of the first substrate to a predetermined position on the drive-signal-supply trunk line, which makes it possible to reduce the extent of the area overlaid with the seal material in the wiring for providing signals to the scanning signal line driver circuit without overlaying the scanning signal line driver circuit with the seal material.

According to the fourth aspect of the present invention, the seal material is disposed stretching over to the predetermined position over a part of the contact holes, making it possible to reduce the possibility where partial breakage and disconnection, current leakage, etc., occur in other contact holes, thereby preventing variability in output signals (typically, from stages) of the scanning signal line driver circuit due to varying capacitances. In addition, the second auxiliary trunk line is disposed near the edge of the substrate, and therefore, contact holes can be positioned at significant distances from the edge of the substrate. Thus, it is possible to prevent or reduce wiring corrosion due to humidity.

According to the fifth aspect of the present invention, the contact holes connect wiring lines by the same material as the pixel electrodes, making it possible to prevent an increase in the number of photomasks to be used in substrate production.

According to the sixth aspect of the present invention, the second auxiliary trunk line is wider than the first auxiliary trunk line, which makes it possible to achieve an appropriate margin from the edge of the first substrate, thereby reducing the extent of an area overlaid with a seal material in the wiring for providing signals to the scanning signal line driver circuit without overlaying the scanning signal line driver circuit with the seal material.

According to the seventh aspect of the present invention, the first auxiliary trunk line is made of the same material as the second auxiliary trunk line, and therefore, it is possible to dispense with, for example, connecting points, such as contact holes, for connecting the first auxiliary trunk line and the second auxiliary trunk line, thereby eliminating the need to be concerned about connection-related issues, such as partial breakage and disconnection.

According to the eighth aspect of the present invention, the auxiliary branch lines are disposed at approximately equal intervals in the arrangement direction such that each auxiliary branch line passes between two circuits adjacent in the arrangement direction within the group of circuits, making it possible to reduce variability in output signals within the group of circuits due to influence (of potential variations via parasitic capacitances) by the auxiliary branch lines.

According to the ninth aspect of the present invention, the auxiliary branch lines are disposed so as to pass between all circuits adjacently paired in the arrangement direction within the group of circuits, making it possible to eliminate or significantly reduce variability in output signals within the group of circuits due to influence by the auxiliary branch lines.

According to the tenth aspect of the present invention, the intercircuit lines are formed so as to be narrowed near their intersections with the auxiliary branch lines, making it possible to decrease coupling capacitance between the intercircuit lines and the auxiliary branch lines, thereby reducing variability in output signals within the group of circuits due to influence by the auxiliary branch lines.

According to the eleventh aspect of the present invention, the auxiliary branch lines are formed likewise, so as to be narrowed near their intersections with the intercircuit lines, making it possible to further decrease the coupling capacitance between the intercircuit lines and the auxiliary branch lines, thereby further reducing the variability in output signals within the group of circuits due to influence by the auxiliary branch lines.

According to the twelfth aspect of the present invention, the end auxiliary line allows an extremely large capacitance (formed by the auxiliary trunk line including the end auxiliary line) to be positioned between the scanning signal line driver circuit and the edge of the substrate, making it possible to more reliably protect the circuit from electrostatic discharge which takes place outside the substrate.

According to the thirteenth aspect of the present invention, the first and second groups of circuits drive each single scanning signal line from opposite ends, making it possible to eliminate or reduce waveform rounding of signals. In addition, the size of circuit elements (typically, TFTs) included in the groups of circuits can be decreased, thereby reducing the extent of an area overlaid with a seal material in the wiring for providing signals to the scanning signal line driver circuit without overlaying the scanning signal line driver circuit with the seal material.

Furthermore, even when each single scanning signal line is driven from one end, scanning signal lines can be divided into a group to be driven by the first group of circuits and a group to be driven by the second group of circuits, making it possible to decrease the size of bistable circuits in the arrangement direction, thereby reducing the extent of an area overlaid with a seal material in the wiring for providing signals to the scanning signal line driver circuit without overlaying the scanning signal line driver circuit with the seal material.

According to the fourteenth aspect of the present invention, the auxiliary branch lines on one side and the auxiliary branch lines on the other side are positioned so as to alternate in the arrangement direction, making it possible to avoid or reduce the possibility where any circuit being significantly affected by a specific scanning signal line coupled thereto results in variability of output signals between the circuit coupled to the scanning signal line and unaffected circuits.

According to the fifteenth aspect of the present invention, the end auxiliary line for connecting the second auxiliary trunk lines at least at one end allows an extremely large capacitance (formed by the auxiliary trunk lines including the end auxiliary line) to be positioned between the scanning signal line driver circuit and the edge of the substrate, making it possible to more reliably protect the circuit from electrostatic discharge which takes place outside the substrate.

According to the sixteenth aspect of the present invention, the second auxiliary trunk line has a plurality of openings, and therefore, for example, when a photo-curable seal material is used, the seal material can be reliably hardened by light passing through the openings, and working conditions of the seal material on opaque wiring can be readily studied via the openings.

According to the seventeenth aspect of the present invention, the widest part of the drive-signal-supply trunk line on which the seal material is disposed has a plurality of openings, so that the seal material, which is photo-curable, can be reliably hardened, and working conditions of the seal material on the wiring can be readily studied.

According to the eighteenth aspect of the present invention, the auxiliary lines, the first auxiliary trunk lines, and the second auxiliary trunk lines are each provided in a plurality of types, so that potentials held in a plurality of subpixel formation portions, typically included in each single pixel formation portion, can be caused to vary differently, making it possible to increase the viewing angle of liquid crystal panels.

MODES FOR CARRYING OUT THE INVENTION

Hereinafter, embodiments of the present invention will be described with reference to the accompanying drawings.

1. First Embodiment 1.1 Overall Configuration and Operation

Figure 1:
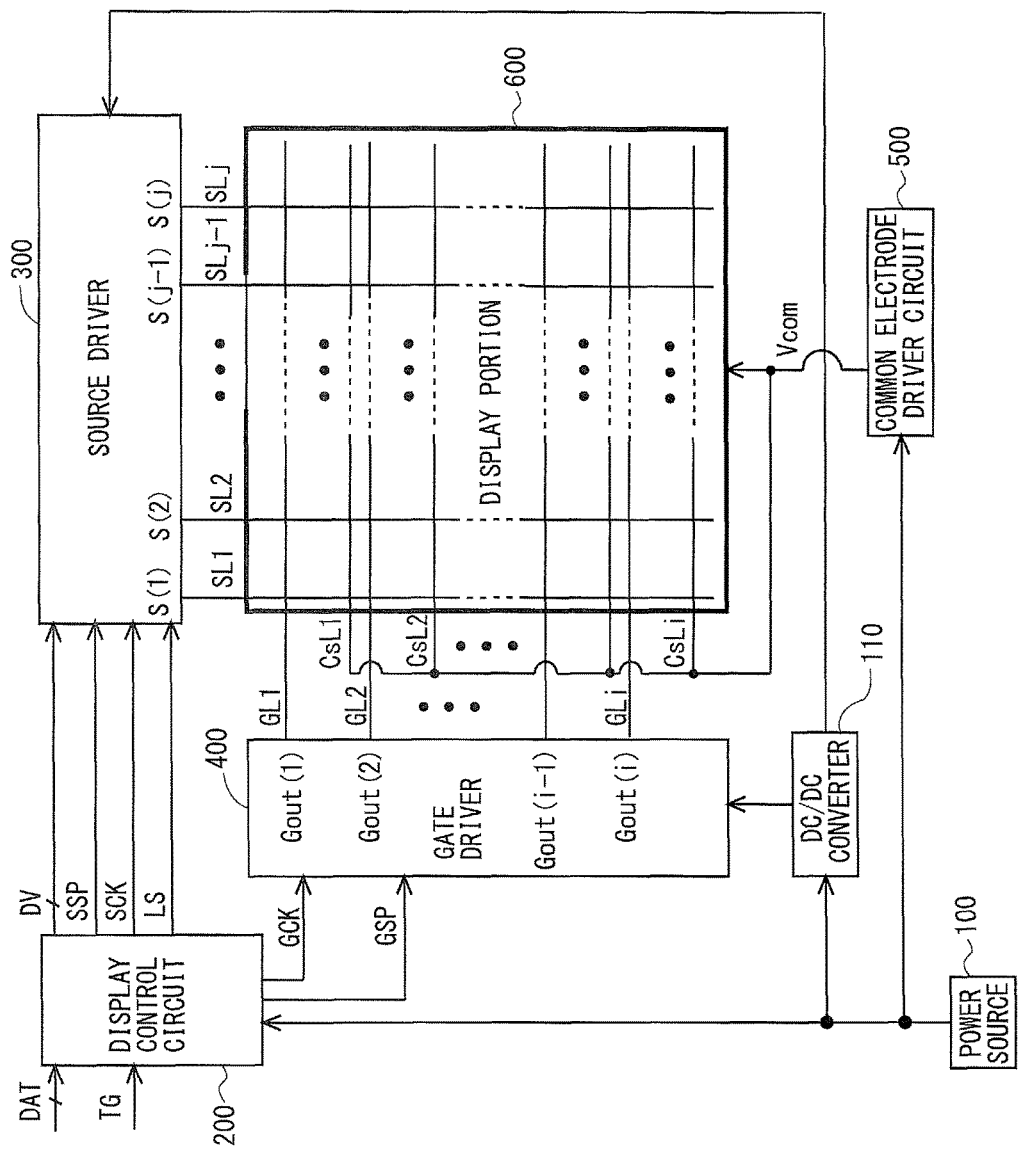
FIG. 1 is a layout diagram of a gate driver included in an active-matrix liquid crystal display device according to a first embodiment of the present invention.

FIG. 1 is a block diagram illustrating the overall configuration of an active-matrix liquid crystal display device according to a first embodiment of the present invention. As shown in FIG. 1, the liquid crystal display device is provided with a power source 100, a DC/DC converter 110, a display control circuit 200, a source driver (video signal line driver circuit) 300, a gate driver (scanning signal line driver circuit) 400, a common electrode driver circuit 500, and a display portion 600. Typically, the gate driver 400 and the display portion 600 are formed on the same substrate, i.e., they are monolithically formed.

The display portion 600 includes a plurality (j) of source bus lines (video signal lines) $SL_1$ to $SL_j$, a plurality (i) of gate bus lines (scanning signal lines) $GL_1$ to $GL_j$, and a plurality (i×j) of pixel formation portions provided so as to correspond to their respective intersections of the source bus lines $SL_1$ to $SL_j$ and the gate bus lines $GL_1$ to $GL_j$.

Figure 2:
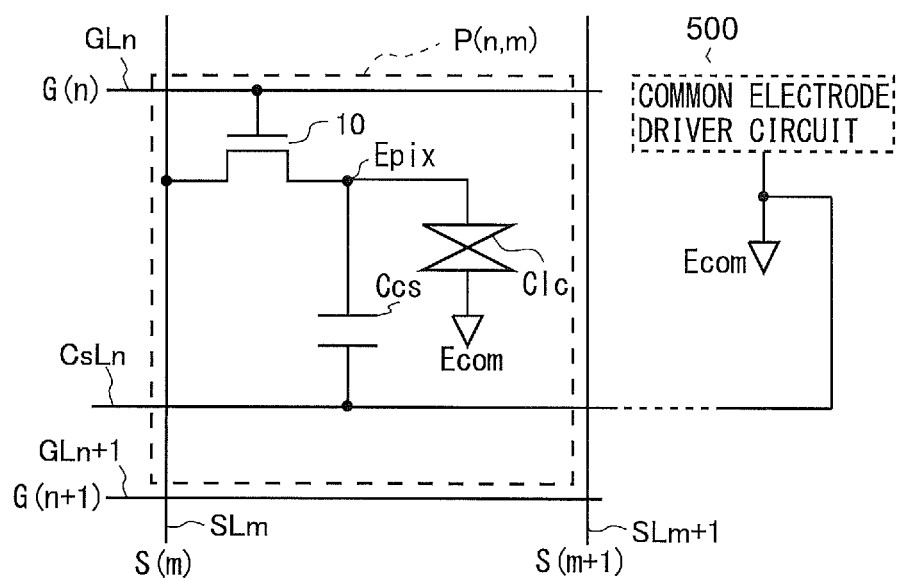
FIG. 2 is a diagram illustrating an equivalent circuit of a pixel formation portion in the first embodiment.

FIG. 2 illustrates an equivalent circuit of a pixel formation portion P(n,m) within the display portion 600 in the present embodiment. As shown in FIG. 2, each pixel formation portion P(n,m) includes a TFT 10, which is a switching element having a gate terminal connected to a gate bus line $GL_n$ and a source terminal connected to a source bus line $SL_m$ passing through the intersection, a pixel electrode $E_{pix}$ connected to a drain terminal of the TFT 10, a common electrode $E_{com}$ commonly provided for the pixel formation portions P(i,j), and a liquid crystal layer commonly provided for the pixel formation portions P(i,j) and sandwiched between the pixel electrode $E_{pix}$ and the common electrode $E_{com}$ as an electro-optic element.

The liquid crystal layer is (hermetically) sealed between a substrate on which the pixel electrode $E_{pix}$ is formed (hereinafter, referred to as a "TFT substrate") and a substrate on which the common electrode $E_{com}$ (along with color filters, etc.) is formed (hereinafter, referred to as an "opposing substrate"). Specifically, the liquid crystal layer is sealed internally (on the display portion 600 side) by a seal material provided in a frame area of the TFT substrate (and a frame area of the opposing substrate). Note that the common electrode $E_{com}$ is not necessarily formed on the opposing substrate, and in the case of, for example, a liquid crystal display device utilizing an electric field horizontal to the surface of a substrate, the common electrode $E_{com}$ may be provided on the TFT substrate side.

Each of the pixel formation portions P(n,m) has a liquid crystal capacitance (also referred to as a "pixel capacitance") $C_{lc}$ formed by the pixel electrode $E_{pix}$ and the common electrode $E_{com}$ opposed thereto with respect to the liquid crystal layer. Each pixel electrode $E_{pix}$ has two source bus lines $SL_m$ and $SL_{m+1}$ provided on opposite sides, and is connected to the source bus line $SL_m$ via the TFT 10. Moreover, auxiliary capacitance lines $CsL_n$ are provided in parallel with gate bus lines $GL_n$, and each of the pixel formation portions P(n,m) has an auxiliary capacitance Ccs formed between the pixel electrode $E_{pix}$ and the auxiliary capacitance line $CsL_n$. Here, the gate bus lines $G_1$ to $GL_i$ and the auxiliary capacitance lines $CsL_1$ to $CsL_i$ are made of the same material, and the wiring line commonly connecting the auxiliary capacitance lines $CsL_1$ to $CsL_i$ outside the display area is made of the same material as the source bus lines $SL_1$ to $SL_i$.

The power source 100 supplies a predetermined source voltage to the DC/DC converter 110, the display control circuit 200, and the common electrode driver circuit 500. On the basis of the source voltage, the DC/DC converter 110 generates a predetermined direct-current voltage for operating the source driver 300 and the gate driver 400, and supplies the voltage to the source driver 300 and the gate driver 400. The common electrode driver circuit 500 provides a predetermined potential $V_{com}$ to the common electrode $E_{com}$ and the auxiliary capacitance lines $CsL_1$ to $CsL_i$. Note that the auxiliary capacitance lines $CsL_1$ to $CsL_i$ may be provided with a potential different from the predetermined potential $V_{com}$ (e.g., by the auxiliary capacitance line driver circuit).

The display control circuit 200 receives an externally transmitted image signal DAT, along with a timing signal group TG, including a horizontal synchronization signal, a vertical synchronization signal, etc., and outputs a digital video signal DV, along with a source start pulse signal SSP, a source clock signal SCK, a latch strobe signal LS, a gate start pulse signal GSP, and a gate clock signal GCK for use in controlling image display on the display portion 600. Note that in the present embodiment, the gate clock signal GCK is composed of four phases, clock signals $CK_1$ to $CK_4$.

The source driver 300 receives the digital video signal DV, the source start pulse signal SSP, the source clock signal SCK, and the latch strobe signal LS outputted by the display control circuit 200, and applies drive video signals $S_{(1)}$ to $S_{(j)}$ to the source bus lines $SL_1$ to $SL_j$, respectively.

On the basis of the gate start pulse signal GSP outputted by the display control circuit 200, the gate driver 400 repeats application of active scanning signals $G_{out(1)}$ to $G_{out(i)}$ to the gate bus lines $GL_1$ to $GL_i$ in cycles of one vertical scanning period. Note that detailed descriptions of the gate driver 400 will be given later.

The drive video signals $S_{(1)}$ to $S_{(j)}$ are applied to the source bus lines $SL_1$ to $SL_j$, and the scanning signals $G_{out(1)}$ to $G_{out(i)}$ are applied to the gate bus lines $GL_1$ to $GL_i$, as described above, so that the display portion 600 displays an image based on the externally transmitted image signal DAT.

1.2 Layout Design of the Gate Driver and the Wiring

Figure 3:
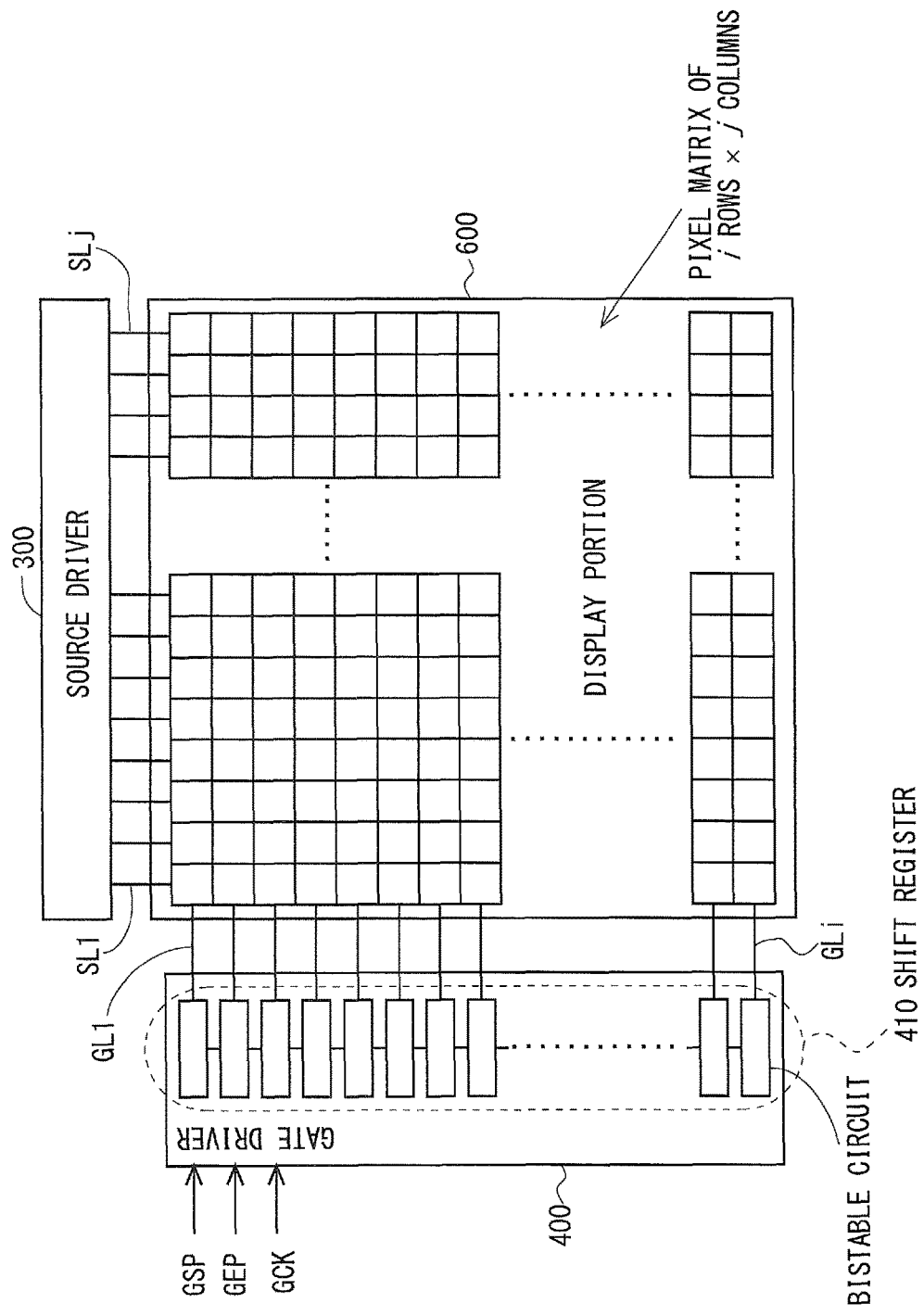
FIG. 3 is a block diagram describing the configuration of the gate driver in the embodiment.

The configuration of the gate driver 400 in the present embodiment will now be described. As shown in FIG. 3, the gate driver 400 includes a multiple-stage shift register 410. The display portion 600 has pixels forming a matrix of i rows×j columns, and the shift register 410 has stages provided in one-to-one correspondence with the rows of the pixel matrix. In addition, the stages of the shift register 410 are bistable circuits which are in one of two states (first and second states) at each point in time, and output signals indicating their respective states (hereinafter, referred to as "state signals"). In this manner, the shift register 410 includes i bistable circuits. Note that the circuit configuration of these bistable circuits is well-known, and therefore, any detailed description thereof will be omitted.

Figure 4:
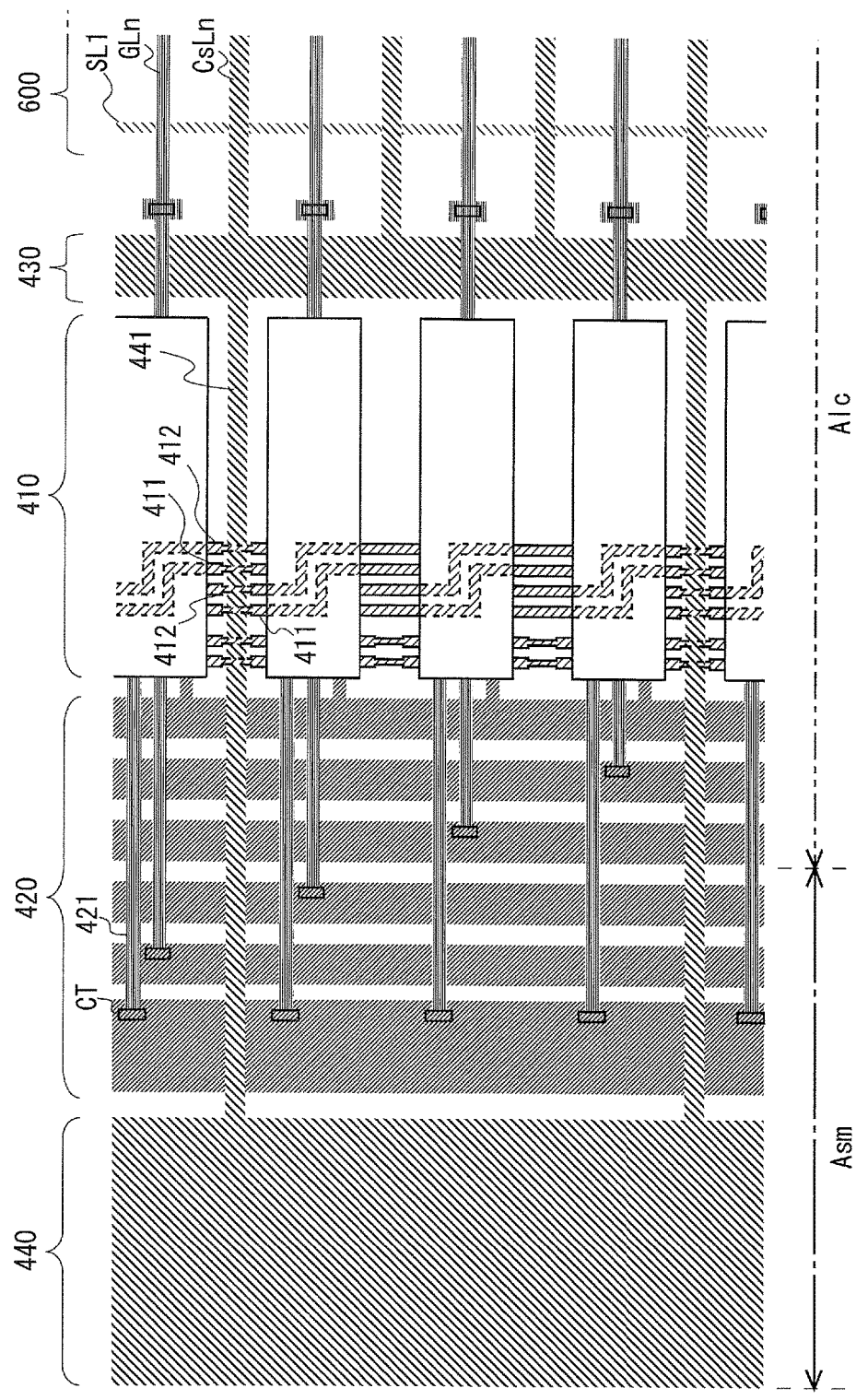
FIG. 4 is a diagram illustrating the layout design of a shift register and various wiring lines in the embodiment.

FIG. 4 is a diagram illustrating the layout design of the shift register 410 in the gate driver 400 and various wiring lines. As described above, the shift register 410 includes i bistable circuits. Each of the bistable circuits is provided with an input terminal for receiving any of the four gate clock signals $CK_1$ to $CK_4$ in their respective phases, an input terminal for receiving a clear signal, an input terminal for receiving a low-potential direct-current voltage VSS, and an output terminal for outputting the scanning signals $G_{out(1)}$ to $G_{out(i)}$.

Figure 10:
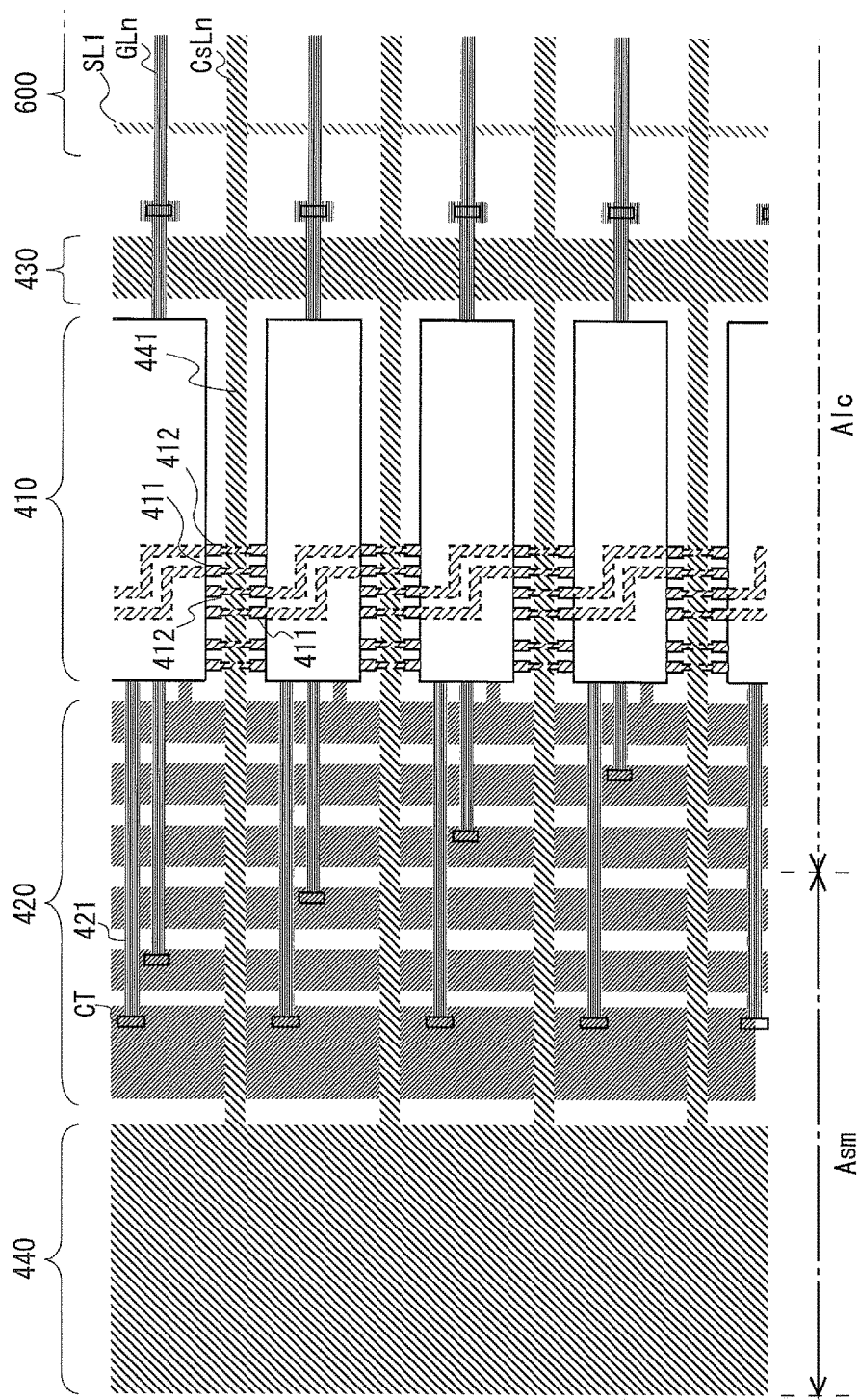
FIG. 10 is a diagram illustrating the layout design of a shift register and various wiring lines in a third embodiment of the present invention.

Each of the bistable circuits is further provided with output and input terminals for sequentially feeding the gate start pulse signal GSP and a reset signal from the previous to the following stage (so as to skip one stage). Note that these signals may be fed so as to skip two or more stages. Such input and output terminals for connecting bistable circuits provided in different stages are connected by inter-circuit lines 411 and 412. In addition, intercircuit lines for connecting adjacent bistable circuits are also provided, as shown in FIG. 10.

In FIG. 4, the gate bus line $G_1$ to $GL_i$ for receiving the scanning signals $G_{out(1)}$ to $G_{out(i)}$ from the output terminals of the bistable circuits are formed to the right of the area where the shift register 410 including the i bistable circuits is formed, the auxiliary capacitance lines $CsL_i$ to $CsL_i$ are formed in parallel therewith, and furthermore, the first auxiliary capacitance trunk line 430 is provided to electrically connect all of the auxiliary capacitance lines $CsL_1$ to $CsL_i$. Note that the gate bus lines $GL_1$ to $GL_j$ and the auxiliary capacitance lines $CsL_1$ to $CsL_i$ are provided within the display portion 600, as described earlier with reference to FIGS. 1 and 2.

Here, the first auxiliary capacitance trunk line 430 is preferably wide enough to keep its resistance low and thereby to maintain the auxiliary capacitance lines $CsL_i$ to $CsL_i$ at the same potential, but in the present embodiment, the first auxiliary capacitance trunk line 430 by itself is not wide enough to keep its resistance low to such an extent as to maintain the auxiliary capacitance lines $CsL_i$ to $CsL_i$ at the same potential.

In addition, provided to the left of the area where the shift register 410 is formed are a second auxiliary capacitance trunk line 440 and a drive-signal-supply trunk line group 420 consisting of a plurality of trunk lines, both of which extend in the direction in which the bistable circuits are arranged (in the top-bottom direction of the figure). The drive-signal-supply trunk line group 420 includes, from left in the figure, a trunk line for the low-potential direct-current voltage VSS, four trunk lines for the four gate clock signals $CK_1$ to $CK_4$ in their respective phases, and four trunk lines for clear signals. Here, the drive-signal-supply trunk line group 420 is made of the same material as the source bus lines $SL_1$ to $SL_j$. These trunk lines are provided in the area opposite to the display portion 600 with respect to the shift register 410.

Here, the second auxiliary capacitance trunk line 440 is wider than the first auxiliary capacitance trunk line 430, and the width is large enough to keep its resistance low to such an extent as to maintain the auxiliary capacitance lines $CsL_1$ to $CsL_i$ at the same potential when the second auxiliary capacitance trunk line 440 is electrically connected to the first auxiliary capacitance trunk line 430. Note that, to connect the auxiliary capacitance trunk line and the common electrode, in the present embodiment, a well-known connecting point (called a common transfer electrode), which is not shown, is provided so that the auxiliary capacitance line is at the same potential as the common electrode. The common transfer electrode may be disposed on the auxiliary capacitance trunk line or may be provided in the vicinity of a corner of the substrate and electrically connected to the auxiliary capacitance trunk line.

Furthermore, as shown in FIG. 4, a plurality of drive-signal-supply branch lines 421 (which extend in the left-right direction in the figure) are provided to apply signals from the drive-signal-supply trunk line group 420 to the bistable circuits of the shift register 410. The drive-signal-supply branch lines 421 connect the trunk lines for the direct-current voltage VSS and the clear signals to their corresponding input terminals of all of the bistable circuits, and also connect any one of the trunk lines for the four gate clock signals $CK_1$ to $CK_4$ in the respective phases to its corresponding input terminal of each of the bistable circuits. These branch and trunk lines are connected via contact holes CT.

Furthermore, provided between the second auxiliary capacitance trunk line 440 and the first auxiliary capacitance trunk line 430 are auxiliary capacitance branch lines 441 for connecting them. The auxiliary capacitance branch lines 441 are not disposed between each bistable circuit and the next, but they are equally spaced so as to sandwich three bistable circuits therebetween, as shown in FIG. 4. However, parasitic capacitances occur between the auxiliary capacitance branch lines 441 and the bistable circuits or the intercircuit lines 411 and 412 for connecting them (and other intercircuit lines), and therefore, output signals from the bistable circuits might vary depending on the presence or absence of such parasitic capacitances. Therefore, it is preferable to form the lines in the shape as shown in FIG. 5 or 6 for the purpose of reducing the parasitic capacitances.

Figure 5:
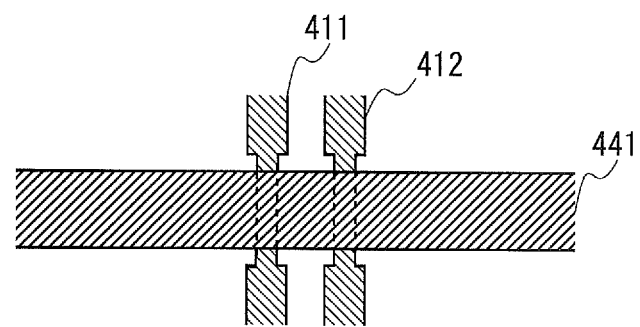
FIG. 5 is a plan view illustrating exemplary shapes of an auxiliary capacitance branch line and an intercircuit line in the embodiment.
Figure 6:
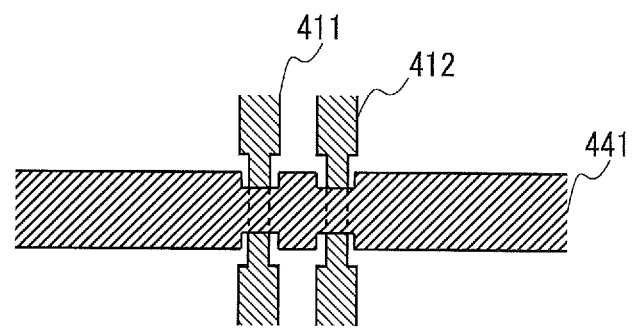
FIG. 6 is a plan view illustrating exemplary shapes of an auxiliary capacitance branch line and an intercircuit line in a variant of the embodiment.

FIG. 5 is a plan view illustrating exemplary shapes of the auxiliary capacitance branch line and the intercircuit line in the present embodiment, and FIG. 6 is a plan view illustrating exemplary shapes of the auxiliary capacitance branch line and the intercircuit line in a variant of the present embodiment.

The intercircuit lines 411 and 412 are formed so as to be narrowed in the vicinity of their intersections with the auxiliary capacitance branch lines 441 below (or above) which they pass, as shown in FIG. 5. Thus, parasitic capacitances to be generated with the auxiliary capacitance branch lines 441 can be reduced.

Alternatively, as shown in FIG. 6, the intercircuit lines 411 and 412 are formed so as to be narrowed in the vicinity of their intersections with the auxiliary capacitance branch lines 441 below (or above) which they pass, and the auxiliary capacitance branch lines 441 are formed so as to be narrowed in the vicinity of their corresponding intersections as well. Thus, parasitic capacitances to be generated with the auxiliary capacitance branch lines 441 can be further reduced when compared to the configuration of the present embodiment shown in FIG. 5. However, the configuration of the present embodiment is preferable in that the resistance of the auxiliary capacitance branch lines 441 is not reduced because the auxiliary capacitance branch lines 441 are formed so as not to be narrowed in any portion.

Note that intercircuit lines other than the intercircuit lines 411 and 412 shown in FIG. 4 are formed so as to be narrowed at portions corresponding to intersections, even if they don't cross the auxiliary capacitance branch lines 441 at such portions. The reason for this is to equalize these other intercircuit lines in terms of resistance between adjacent bistable circuits, but the intercircuit lines that don't cross the auxiliary capacitance branch lines 441 may have no narrower portions, as in the case of the intercircuit lines 411 and 412. Moreover, the intercircuit lines 411 and 412 may be formed so as to be narrowed at portions that correspond to intersections but don't cross the auxiliary capacitance branch lines 441 as shown in FIG. 4.

Furthermore, the first and second auxiliary capacitance trunk lines 430 and 440 are formed with the same wiring as the auxiliary capacitance branch lines 441 and the auxiliary capacitance lines $CsL_1$ to $CsL_1$, as shown in FIG. 4, and these lines are made of the same material as the gate bus lines $G_1$ to $GL_i$. Accordingly, the trunk lines and the branch lines are not required to be connected using contact holes CT. Note that the gate bus lines $G_1$ to $GL_i$ are connected to output terminals of the bistable circuits, which are made of the same material as the source bus lines $SL_1$ to $SL_j$, outside the display portion, and the drive-signal-supply trunk line group is made of the same material as the source bus lines $SL_1$ to $SL_j$. Here, in the case where the drive-signal-supply trunk line group is made of the same material as the gate bus lines $G_1$ to $GL_i$, if the first and second auxiliary capacitance trunk lines 430 and 440 and the auxiliary capacitance branch lines 441 are made of the same material as the source bus lines $SL_1$ to $SL_j$, the trunk lines and the branch lines are not required to be connected using contact holes CT. Hereinafter, the structure of the contact holes CT for connecting the drive-signal-supply trunk line group 420 to the branch lines will be described with reference to FIG. 7.

Figure 7:
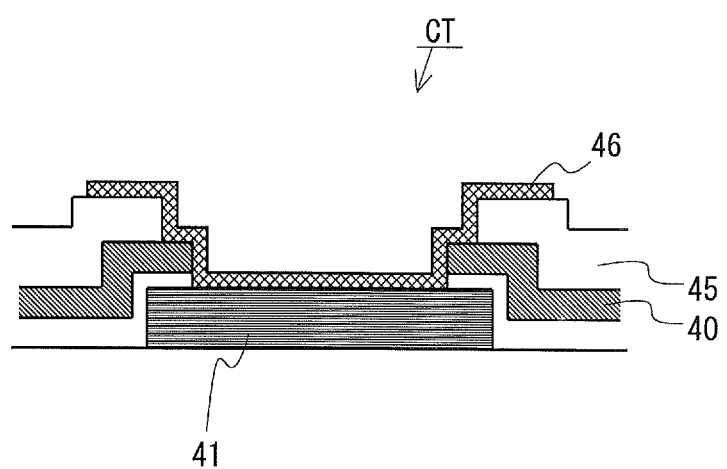
FIG. 7 is a cross-sectional view illustrating the structure of a contact hole in the embodiment.

FIG. 7 is a cross-sectional view illustrating the structure of a contact hole. FIG. 7 shows a source material 40 as part of the drive-signal-supply trunk line group 420, a gate material 41 as part of the drive-signal-supply branch line 421, an interlayer insulating film 45, and a pixel electrode material 46 provided over a contact hole CT to electrically connect the source material 40 and the gate material 41.

Here, the interlayer insulating film 45 is an organic film, an inorganic film, or a lamination thereof, and since its configuration is the same as a well-known configuration, any detailed description thereof will be omitted. Moreover, the pixel electrode material 46 is formed in the same production process and of the same material (e.g., ITO) as the pixel electrodes of the aforementioned pixel formation portions. Note that such a wiring formation process and a wiring connection process using contact holes are well-known, and therefore, any detailed descriptions thereof will be omitted, but briefly, the source material 40, the gate material 41, and the interlayer insulating film 45 are formed on a glass substrate in a well-known production process before a contact hole is provided so as to expose the gate material 41. An ITO film is formed over the contact hole as the pixel electrode material 46 so as to contact the exposed gate material 41. The ITO film connects the source material 40 and the gate material 41.

Note that the wiring connection process using contact holes allows various well-known configurations to be employed, and for example, contact holes to expose the gate material 41 and contact holes to expose the source material 40 may be adjacently formed and commonly connected by the pixel electrode material 46, thereby connecting the source material 40 and the gate material 41.

Here, the pixel electrode material is exposed on the contact holes CT, as shown in FIG. 7 (and as in the aforementioned well-known configuration), and therefore, the seal material might damage the pixel electrode material composed of ITO. Specifically, as described earlier, the seal material in some cases is mixed with a spacer material (e.g., fiber glass) or suchlike for the purpose of sandwiching a cell gap, and the spacer material contacting the pixel electrode material might result in partial breakage, disconnection, etc. Consequently, any increase in resistance and disconnection might occur at connecting points. Note that such breakage and disconnection similarly occur even when a well-known material, such as IZO (indium zinc oxide), is used in the pixel electrode material.

Furthermore, to electrically connect the common electrode $E_{com}$ formed on the opposing substrate and corresponding wiring (e.g., the second auxiliary capacitance trunk line 440) on the TFT substrate, it is known that the seal material is mixed with well-known conductive particles (elastic substances coated with gold, silver or the like). This configuration might cause current to leak from the pixel electrode material exposed over the contact holes via the mixed conductive particles.

Accordingly, the contact holes shown in FIG. 4 are preferably not overlaid with the seal material as much as possible. In FIG. 4, the area that is overlaid with the seal material is shown as $A_{sm}$, and the area that is not overlaid with the seal material and thereby has a liquid crystal sealed therein is shown as $A_{lc}$. As can be appreciated from FIG. 4, among a number of contact holes CT provided in the drive-signal-supply trunk line group 420, those formed in two trunk lines on the right side of the figure are not overlaid with the seal material. Therefore, these contact holes are resistant to partial breakage and disconnection or current leakage, so that occurrence of abnormal operation can be generally inhibited.

Furthermore, the bistable circuits included in the shift register are not overlaid with the seal material at all. Therefore, there is no variation in the range to be overlaid with the liquid crystal, so that there is no variability of output signals among the circuits.

The reason why the present embodiment can eliminate or reduce the effect of the seal material in such a manner is that the second auxiliary capacitance trunk line 440 is additionally provided and disposed at the closest position to the periphery of the substrate. Assuming that the second auxiliary capacitance trunk line 440 is not provided at all, the area that would be overlaid with the seal material is positioned as shown in FIG. 8.

Figure 8:
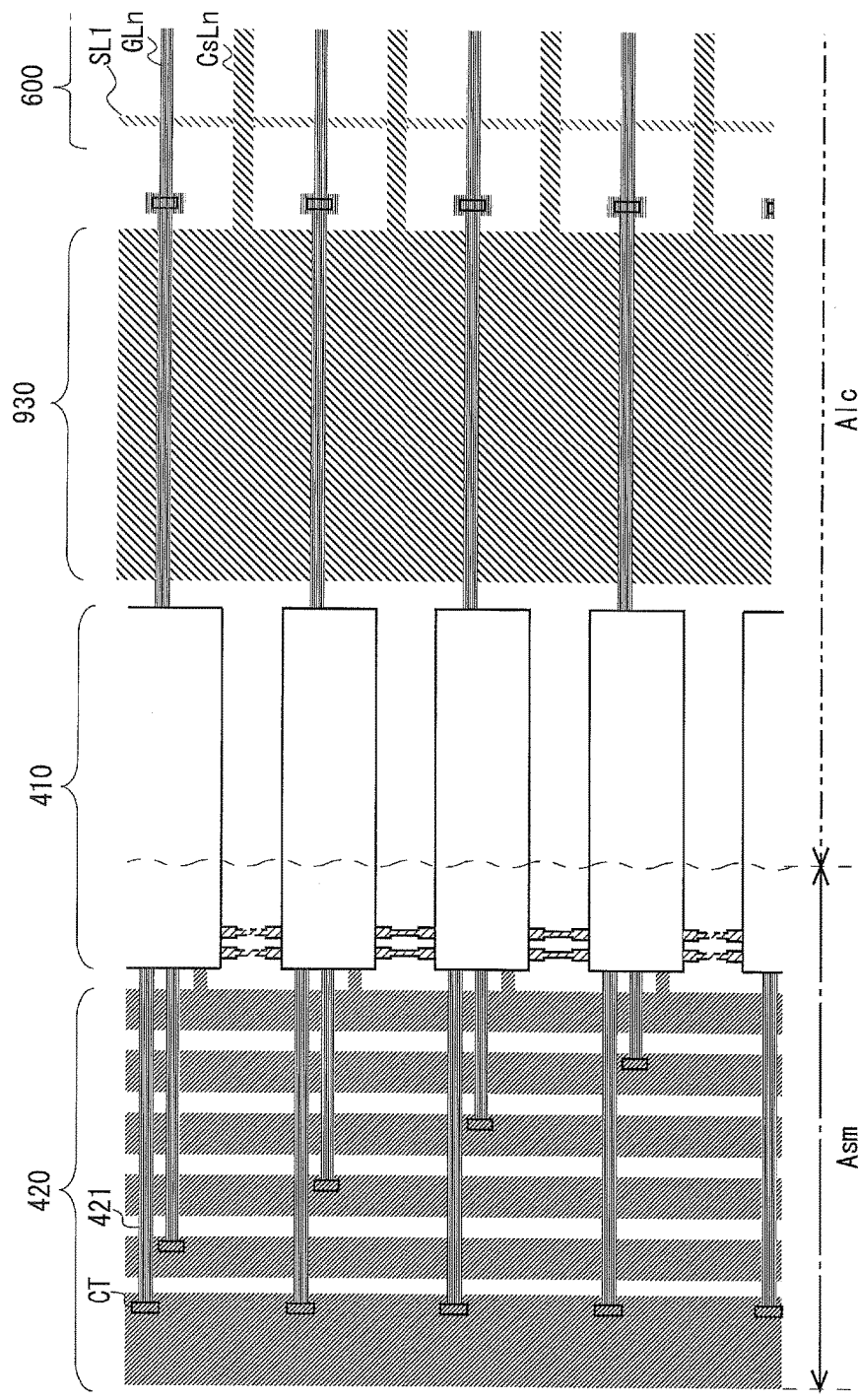
FIG. 8 is a diagram illustrating the layout design of a shift register and various wiring lines where no second auxiliary capacitance trunk line is assumed to be additionally provided in the embodiment.

FIG. 8 is a diagram illustrating the layout design of a shift register in a gate driver and various wiring lines where no second auxiliary capacitance trunk line is assumed to be additionally provided. As shown in FIG. 8, area $A_{sm}$ overlaid with the seal material spreads over portions of the bistable circuits in the shift register 410, and the overlaid area is not consistent among the bistable circuits. More specifically, the seal material is applied between the TFT substrate and the opposing substrate, and thereafter cured by heat, ultraviolet radiation, or both. At this time, the seal material does not expand uniformly but within the range from tens to hundreds of micrometers depending on various conditions. Accordingly, due to such nonuniformity, area $A_{sm}$ overlaid with the seal material becomes irregular over the bistable circuits in the shift register 410.

Furthermore, as shown in FIG. 8, a number of contact holes CT provided in the drive-signal-supply trunk line group 420 are all located in area $A_{sm}$ overlaid with the seal material, and therefore, all of the contact holes CT might have partial breakage and disconnection, current leakage, etc., mentioned earlier.

On the other hand, when compared to the hypothetical configuration shown in FIG. 8, the configuration of the present embodiment shown in FIG. 4 allows reduction in the number of contact holes CT (provided in the drive-signal-supply trunk line group 420) in area $A_{sm}$ overlaid with the seal material, thereby reducing the possibility of partial breakage and disconnection, current leakage, etc., mentioned earlier.

Furthermore, in the configuration of the present embodiment shown in FIG. 8, unlike in the hypothetical configuration shown in FIG. 8, the bistable circuits included in the shift register 410 are not located within area $A_{sm}$ overlaid with the seal material, and therefore, they are uniformly overlaid with the liquid crystal (i.e., the range to be overlaid does not vary), resulting in no variability of output signals among the circuits.

1.3 Effect

As described above, in the present embodiment, the second auxiliary capacitance trunk line 440 is additionally provided and disposed at the closest position to the periphery of the substrate, so that the extent of an area overlaid with a seal material within a wiring area for providing signals to a shift register can be reduced without increasing a frame area and overlaying the shift register with the seal material. Consequently, it is possible to reduce the possibility where partial breakage and disconnection, current leakage, etc., mentioned earlier, occur in contact holes CT, thereby preventing variability in output signals of bistable circuits in the shift register due to varying capacitances.

Furthermore, disposing the second auxiliary capacitance trunk line 440 at the closest position to the periphery (edge) of the substrate makes it possible to dispose contact holes CT in positions significantly distanced from the edge of the substrate. Thus, it is possible to prevent or reduce wiring corrosion due to humidity. Specifically, ITO, a pixel electrode material exposed over the contact holes CT, is susceptible to corrosion due to humidity, and in the case where aluminum is used as a gate or source material, corrosion due to humidity readily occurs as well. Accordingly, the configuration of the present embodiment, which allows contact holes CT to be significantly distanced from the edge of the substrate where moisture in the air readily enters, can prevent or reduce wiring corrosion due to humidity.

Furthermore, disposing the second auxiliary capacitance trunk line 440 at the closest position to the periphery (edge) of the substrate allows a large capacitance (formed by the second auxiliary capacitance trunk line 440) to be located between the bistable circuits of the shift register and the edge of the substrate. Thus, the bistable circuits can be protected from electrostatic discharge (ESD) which takes place outside the substrate. Moreover, in the case where other wiring for disconnection correction and investigation is not located between the edge of the substrate and the second auxiliary capacitance trunk line 440, the wiring can be protected from electrostatic discharge. Note that by using the potential of the second auxiliary capacitance trunk line 440 as a common potential, the effect of protection from electrostatic discharge can be further increased.

2. Second Embodiment

2.1 Overall Configuration and Operation

The overall configuration of the liquid crystal display device in the present embodiment is the same as in the first embodiment shown in FIG. 1, the configurations of the pixel formation portion P and the gate driver 400 are the same as those shown in FIGS. 2 and 3, respectively, in the first embodiment, the same elements are denoted by the same characters, and any descriptions thereof will be omitted.

In the present embodiment, in addition to the first and second auxiliary capacitance trunk lines 430 and 440 in the first embodiment shown in FIG. 4, end auxiliary capacitance lines are provided to connect ends of these trunk lines. This characteristic feature will be described with reference to FIG. 9.

2.2 Layout Design of the Gate Driver and the Wiring

Figure 9:
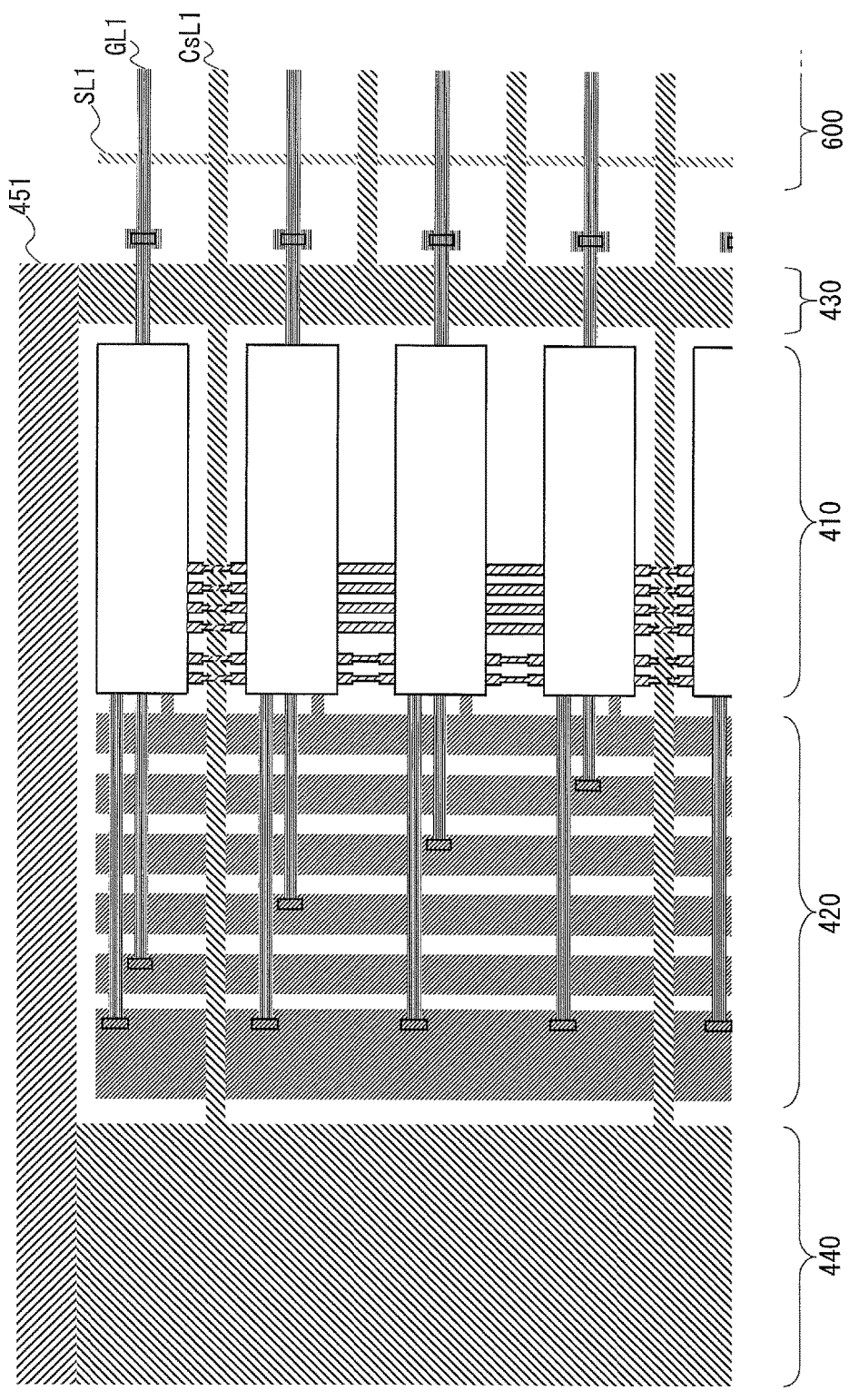
FIG. 9 is a diagram illustrating the layout design of a shift register and various wiring lines in a second embodiment of the present invention.

FIG. 9 is a diagram illustrating the layout design of the shift register 410 in the gate driver 400 and various wiring lines in the present embodiment. In FIG. 9, there are provided the shift register 410 composed of i bistable circuits, the first auxiliary capacitance trunk line 430 for electrically connecting all of the auxiliary capacitance lines $CsL_1$ to $CsL_i$, the second auxiliary capacitance trunk line 440, the drive-signal-supply trunk line group 420, and various wiring lines, such as the auxiliary capacitance branch lines, as in FIG. 4, and unlike in the configuration shown in FIG. 4, an end auxiliary capacitance line 450 is further provided.

The end auxiliary capacitance line 450 is positioned so as to connect one end (top side of the figure) of the first auxiliary capacitance trunk line 430 to one end (top side of the figure) of the second auxiliary capacitance trunk line 440, as shown in FIG. 9. Moreover, although not shown here, a similar end auxiliary capacitance line is positioned so as to connect the other end (to be located on the bottom side of the figure) of the first auxiliary capacitance trunk line 430 to the other end (to be located on the bottom side of the figure) of the second auxiliary capacitance trunk line 440.

In this manner, the end auxiliary capacitance line 450, the unillustrated end auxiliary capacitance line, and the first and second auxiliary capacitance trunk lines 430 and 440 are arranged in a relationship so as to surround the bistable circuits of the shift register 410. Thus, the bistable circuits can be more effectively protected from electrostatic discharge (ESD) which takes place outside the substrate.

Note that even if only one of the end auxiliary capacitance line 450 and the unillustrated end auxiliary capacitance line is disposed, the bistable circuits can be protected from electrostatic discharge at the edge of the substrate where the end auxiliary capacitance line is provided, and therefore, the effect of electrostatic protection can be increased compared to the first embodiment.

2.3 Effect

As described above, in addition to achieving each of the aforementioned effects of the first embodiment, the present embodiment makes it possible to increase the effect of electrostatic protection by additionally providing the second auxiliary capacitance trunk line 440 (along with the unillustrated end auxiliary capacitance line), so that the bistable circuits can be protected from electrostatic discharge at the edge of the substrate where the end auxiliary capacitance line is provided.

3. Third Embodiment

3.1 Overall Configuration and Operation

The overall configuration of the liquid crystal display device in the present embodiment is the same as in the first embodiment shown in FIG. 1, the configurations of the pixel formation portion P and the gate driver 400 are the same as those of the first embodiment respectively shown in FIGS. 2 and 3, the same elements are denoted by the same characters, and any descriptions thereof will be omitted.

In the present embodiment, as in the first embodiment shown in FIG. 4, the auxiliary capacitance branch lines 441 are provided between the second auxiliary capacitance trunk line 440 and the first auxiliary capacitance trunk line 430 so as to connect them, but unlike in the case shown in FIG. 4, the auxiliary capacitance branch lines 441 are provided between each bistable circuit and the next. This characteristic feature will be described with reference to FIG. 10.

3.2 Layout Design of the Gate Driver and the Wiring

FIG. 10 is a diagram illustrating the layout design of the shift register 410 in the gate driver 400 and various wiring lines in the present embodiment. In FIG. 10, there are provided the shift register 410 composed of i bistable circuits, the first auxiliary capacitance trunk line 430 for electrically connecting all of the auxiliary capacitance lines $CsL_1$ to $CsL_i$, the second auxiliary capacitance trunk line 440, the drive-signal-supply trunk line group 420, and various wiring lines, such as the auxiliary capacitance branch lines, as in FIG. 4, and unlike in the configuration shown in FIG. 4, the auxiliary capacitance branch lines 441 are provided between the bistable circuits of the shift register 410.

Note that parasitic capacitances occur between the auxiliary capacitance branch lines 441 and the bistable circuits or the intercircuit lines 411 and 412 for connecting them (and other intercircuit lines), and therefore, it is preferable to form the lines in the shape shown in FIG. 5 or 6, as described earlier, for the purpose of reducing suchparasitic capacitances.

3.3 Effect

As described above, in addition to achieving each of the aforementioned effects of the first embodiment, the present embodiment makes it possible to equalize the effect of parasitic capacitances between the auxiliary capacitance branch lines 441 and the bistable circuits (and their intercircuit lines) by providing the auxiliary capacitance branch lines 441 between the bistable circuits of the shift register 410. Thus, it is possible to inhibit variability in output signals among the circuits.

4. Fourth Embodiment

4.1 Overall Configuration and Operation

The overall configuration of the liquid crystal display device in the present embodiment is almost the same as in the first embodiment shown in FIG. 1, the configuration of the pixel formation portion P is the same as that of the first embodiment shown in FIG. 2, the same elements are denoted by the same characters, and any descriptions thereof will be omitted. In the present embodiment, unlike in the first embodiment, the gate driver 400 includes a left-side shift register 410 and a right-side shift register 413.

Figure 11:
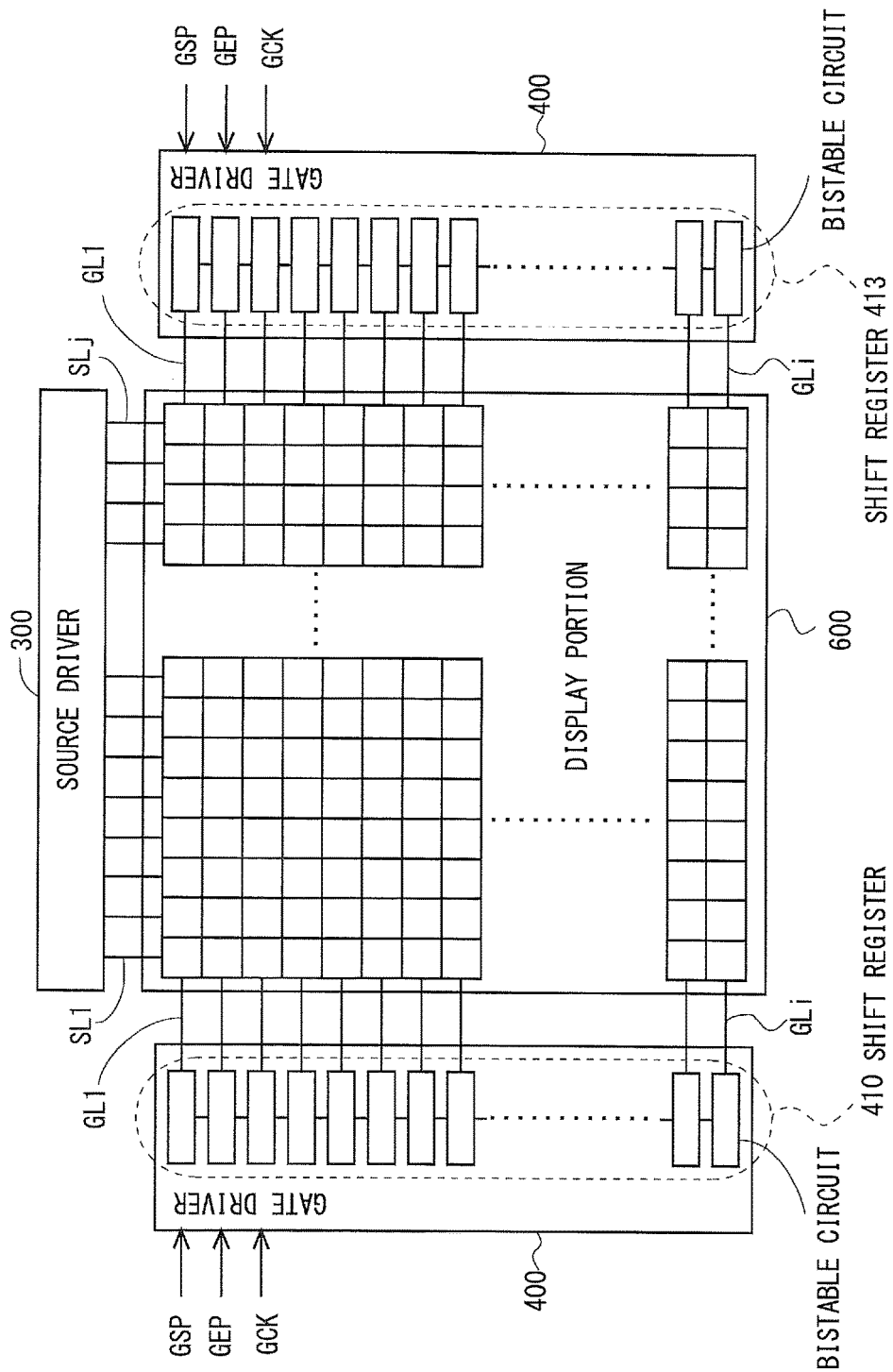
FIG. 11 is a block diagram describing the configuration of a gate driver in a fourth embodiment of the present invention.

Specifically, as shown in FIG. 11, the gate driver 400 in the present embodiment includes the multi-stage shift register 410 provided to the left (in the figure) of the display portion 600 and the multi-stage shift register 413 provided to the right (in the figure) of the display portion 600. These shift registers have the same configuration composed of i bistable circuits, receive the same signals, such as clock signals, and then output the same scanning signals to the same gate bus lines from opposite sides (left or right in the figure). As a result, it is possible to drive the gate bus lines without rounding the waveform of the scanning signals.

In this manner, the shift registers 410 and 413 are provided on the left and right sides, and therefore, unlike in the case shown in FIG. 4, the drive-signal-supply trunk line group 420 for driving them, the first and second auxiliary capacitance trunk lines 430 and 440, various other wiring lines, etc., are provided on each of the sides to the left and right of the display portion 600. This characteristic feature will be described with reference to FIG. 12.

4.2 Layout Design of the Gate Driver and the Wiring

Figure 12:
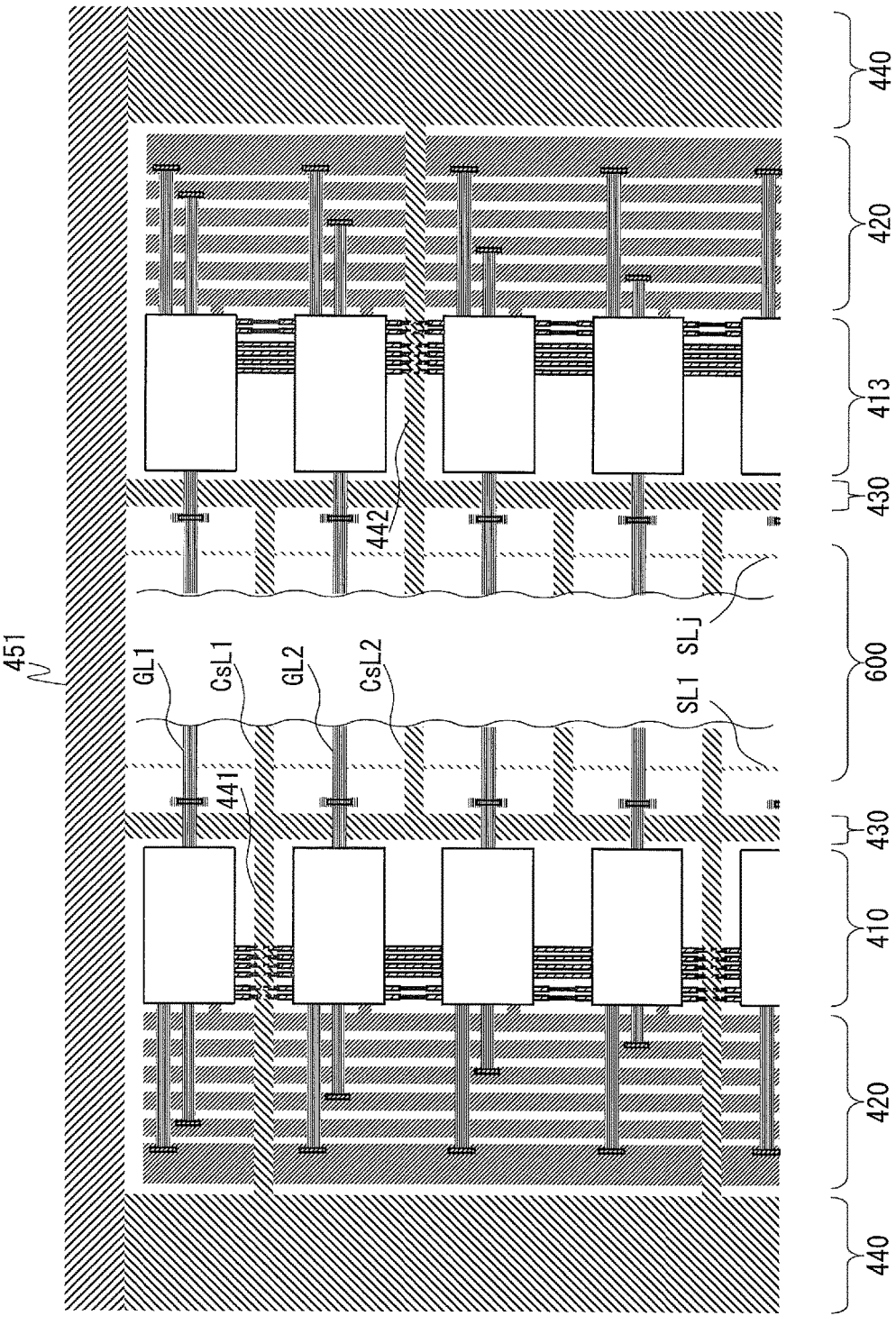
FIG. 12 is a diagram illustrating the layout design of two shift registers and various wiring lines in the embodiment.

FIG. 12 is a diagram illustrating the layout design of the shift registers 410 and 413 in the gate driver 400 and various wiring lines in the present embodiment. In FIG. 12, provided in a frame area to the left of the display portion 600 are the shift register 410 composed of i bistable circuits, the first auxiliary capacitance trunk line 430 for electrically connecting all of the auxiliary capacitance lines $CsL_1$ to $CsL_i$, the second auxiliary capacitance trunk line 440, the drive-signal-supply trunk line group 420, and various wiring lines, such as the auxiliary capacitance branch lines 441, as in FIG. 4, and also provided in the frame area to the right of the display portion 600 are the shift register 413 and the various wiring lines, which are the same as their counterparts and only differ in the positions.

Here, the auxiliary capacitance branch lines 441 and 442 formed in the frame area to the left and right, respectively, of the display portion 600, are disposed such that their corresponding rows are positioned deviating from each other, as shown in FIG. 12. Specifically, the auxiliary capacitance branch line 441 is provided between the first and second bistable circuits of the shift register 410, whereas the auxiliary capacitance branch line 442 is provided between the second and third bistable circuits of the shift register 413.

In this manner, the auxiliary capacitance branch lines are provided deviating from each other on the sides to the left and right of the display portion 600, such that their positions correspond to different rows. As a result, (two) bistable circuits affected by the auxiliary capacitance branch line 441 cannot be the same (two) bistable circuits affected by the auxiliary capacitance branch line 442. Thus, it is possible to avoid or reduce the possibility where any bistable circuit being significantly affected by a specific gate bus line coupled thereto results in variability of output signals between the bistable circuit coupled to the gate bus line and unaffected bistable circuits.

Note that in the configuration shown in FIG. 12, both the second bistable circuits are affected by the auxiliary capacitance branch lines, but the first and third bistable circuits are affected by only one of the auxiliary capacitance branch lines 441 and 442, so that variability in output signals of the bistable circuits can be reduced. However, in the case where it is desirable to further reduce the variability, the auxiliary capacitance branch lines 441 and 442 may be disposed such that the bistable circuits are affected by only one or none of the auxiliary capacitance branch lines 441 and 442.

Furthermore, in a configuration similar to the third embodiment, the auxiliary capacitance branch lines 441 may be provided between every other bistable circuit of the shift register 410, and the auxiliary capacitance branch lines 442 may be provided between every other bistable circuit of the shift register 413, but not in positions corresponding to the same rows as the auxiliary capacitance branch lines 441. As a result, it is possible to make the influence of parasitic capacitances generally uniform between the auxiliary capacitance branch lines 441 and 442 and the bistable circuits (and other intercircuit lines), (although different between the left and right sides). Thus, it is possible to further inhibit variability in output signals of the circuits.

Furthermore, in the present embodiment, the end auxiliary capacitance line 451, which is almost the same as that in the second embodiment shown in FIG. 9, is provided (along with an unillustrated other end auxiliary capacitance line), but unlike in the second embodiment, the end auxiliary capacitance line 451 is provided so as to connect one end of the first auxiliary capacitance trunk line 430 formed on the left side in the frame area to one end of the first auxiliary capacitance trunk line 430 formed on the right side in the frame area, i.e., so as to surround the display portion 600. As a result, it is possible to further increase the effect of protection from electrostatic discharge at the edge of the substrate where the end auxiliary capacitance lines are provided. Note that similar to the second embodiment, one of the two end auxiliary capacitance lines may be omitted.

In particular, by designing each source bus line so as not to cross the end auxiliary capacitance line 451 at the tip opposite to where the source driver is disposed, it is rendered possible to allow the source bus lines and TFTs in the display portion to have an enhanced electrostatic protection effect.

4.3 Effect

As described above, in the present embodiment, in addition to achieving each of the aforementioned effects of the first embodiment, the auxiliary capacitance branch lines 441 and 442 are formed on the left and right sides, respectively, within the frame area, so as not to be at corresponding positions in the same row, so that it is possible to avoid or reduce the possibility where any bistable circuit being significantly affected by a specific gate bus line coupled thereto results in variability of output signals between the bistable circuit coupled to the gate bus line and unaffected bistable circuits.

Note that in the present embodiment, each single scanning signal line is driven from opposite ends, but even in the case where each single scanning signal line is driven from one end (typically, on the side determined alternatingly in the arrangement direction of the scanning signal line), scanning signal lines are divided into a group to be driven by the left-side shift register 410 and a group to be driven by the right-side shift register 413, which makes it possible to reduce the size of the bistable circuits in the arrangement direction, so that the extent of an area overlaid with a seal material in the wiring for providing signals to the scanning signal line driver circuit can be reduced without overlaying the scanning signal line driver circuit with the seal material.

5. Fifth Embodiment

5.1 Overall Configuration and Operation

The overall configuration of the liquid crystal display device in the present embodiment is the same as in the first embodiment shown in FIG. 1, the configurations of the pixel formation portion P and the gate driver 400 are the same as those of the first embodiment shown in FIGS. 2 and 3, respectively, the same elements are denoted by the same characters, and any descriptions thereof will be omitted.

In the present embodiment, various wiring lines are provided as in the first embodiment shown in FIG. 4, but in the present embodiment, openings are provided in the second auxiliary capacitance trunk line 440 and the widest line for direct-current voltage VSS in the drive-signal-supply trunk line group 420. This characteristic feature will be described with reference to FIG. 13.

5.2 Layout Design of the Wiring

Figure 13:
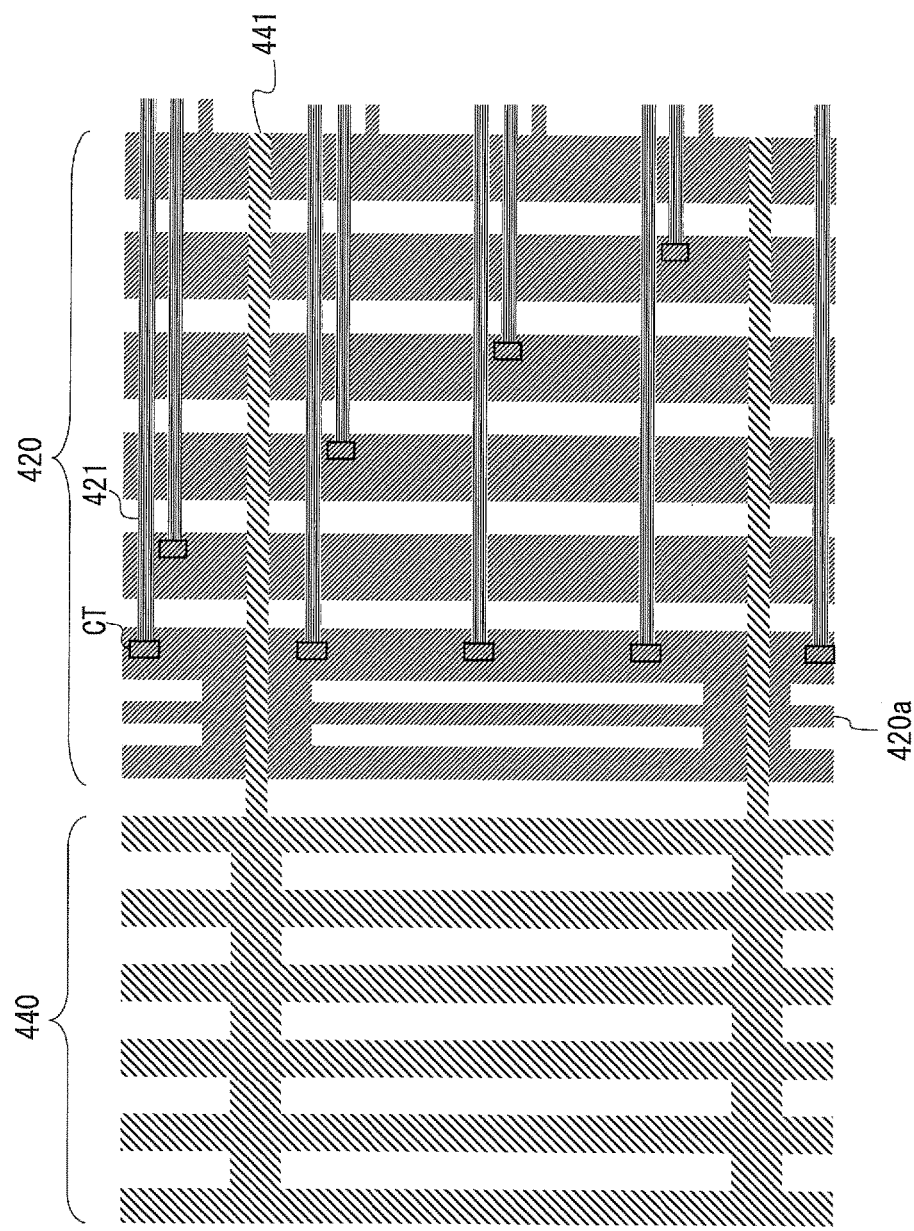
FIG. 13 is a diagram illustrating the layout design of a shift register and various wiring lines in a fifth embodiment of the present invention.

FIG. 13 is a diagram illustrating the layout design of various wiring lines in the present embodiment. Slit-like openings are provided in the second auxiliary capacitance trunk line 440 and a line 420a for direct-current voltage VSS, which is the widest line in the drive-signal-supply trunk line group 420, as shown in FIG. 13.

The openings have the function of allowing a seal material positioned thereabove to be reliably cured. Specifically, in the case where a photo, e.g., UV, curable (or thermosetting) seal material is used, little light reaches the seal material on wiring lines not penetrable to light. This is particularly true on wide lines. Therefore, openings for light to pass through are formed in wide lines, thereby reliably curing the seal material.

Furthermore, in the case where a seal material not to be cured by light (e.g., to be cured by heat only) is used, the openings do not function to allow the seal material to be reliably cured, but working conditions of the seal material, for example, as to the width and whether or not the seal material has been completely cured, can be observed via the openings. Specifically, the working conditions of the seal material cannot be normally studied through the wiring portion formed on the glass substrate, but it is possible if openings are formed. Moreover, a black matrix is normally formed in the area of the opposing substrate (to be attached) that corresponds to the frame area, and therefore, the working conditions of the seal material cannot be studied from the opposing substrate side. Accordingly, by providing the openings, it is rendered possible to readily study the working conditions of the seal material (on the wiring), which is normally difficult.

5.3 Effect

As described above, in the present embodiment, in addition to achieving each of the aforementioned effects of the first embodiment, openings are provided in wide wiring lines on which the seal material is provided, specifically, the second auxiliary capacitance trunk line 440 and at least the widest line (e.g., the wiring line 420a for direct-current voltage VSS) of the drive-signal-supply trunk line group 420, so that a photo-curable seal material can be reliably hardened, and working conditions of the seal material on the wiring lines can be readily studied.

6. Sixth Embodiment

6.1 Overall Configuration and Operation

The overall configuration of the liquid crystal display device in the present embodiment is almost the same as in the first embodiment shown in FIG. 1, but significantly differs in that, in the present embodiment, each pixel formation portion is composed of two subpixel formation portions $P_a$ and $P_b$ (hereinafter, also referred to as a lower subpixel $P_a$ and an upper subpixel $P_b$), and auxiliary capacitance lines for providing different potentials are connected to the subpixel formation portions $P_a$ and $P_b$, respectively. Except for these, the configuration of the gate driver 400 and other features are the same as in the first embodiment, the same elements are denoted by the same characters, and any descriptions thereof will be omitted. The configurations of the subpixel formation portions $P_a$ and $P_b$ will now be described with reference to FIG. 14.

Figure 14:
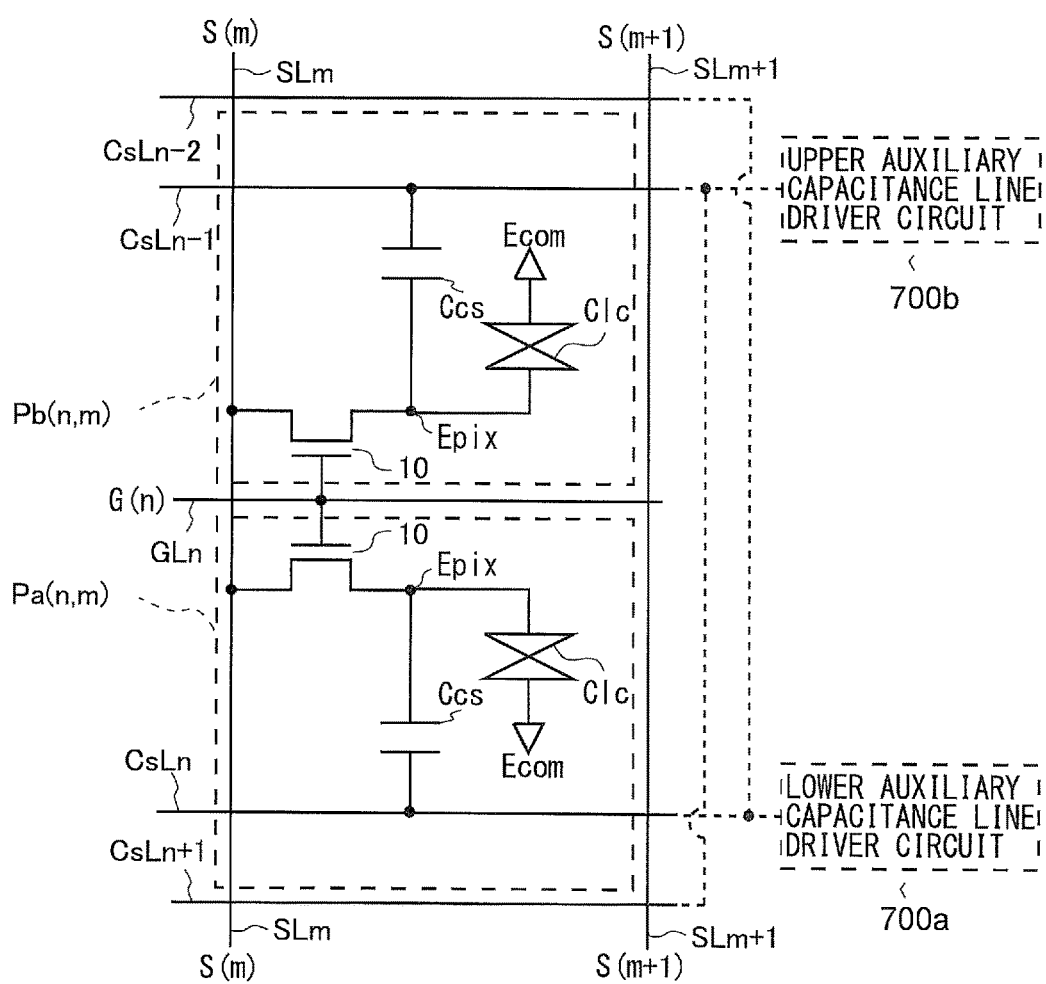
FIG. 14 is a diagram illustrating an equivalent circuit of a pixel formation portion in a sixth embodiment of the present invention.

FIG. 14 illustrates an equivalent circuit of a pixel formation portion composed of subpixel formation portions $P_a(n, m)$ and $P_b(n,m)$ in the display portion 600 of the present embodiment. As shown in FIG. 14, each of the subpixel formation portions $P_a(n,m)$ and $P_b(n,m)$ includes a TFT 10, which is a switching element having a gate terminal connected to a gate bus line $GL_n$ and a source terminal connected to a source bus line $SL_m$ passing through the intersection, a pixel electrode $E_{pix}$ connected to a drain terminal of the TFT 10, a common electrode $E_{com}$ commonly provided for the pixel formation portions, and a liquid crystal layer commonly provided for the pixel formation portions and sandwiched between the pixel electrode $E_{pix}$ and the common electrode $E_{com}$ as an electro-optic element.

Moreover, an auxiliary capacitance line $CsL_n$ is provided in parallel with gate bus lines $GL_n$, and auxiliary capacitances Ccs are formed between the pixel electrode $E_{pix}$ and an auxiliary capacitance line $CsL_{n-1}$ in the upper subpixel formation portion $P_b(n,m)$ and between the pixel electrode $E_{pix}$ and the auxiliary capacitance line $CsL_n$ in the lower subpixel formation portion $P_a(n,m)$. In addition, the auxiliary capacitance line $CsL_{n-1}$ (along with every other adjacent auxiliary capacitance line) is driven by an upper auxiliary capacitance line driver circuit 700b at a predetermined potential, and the auxiliary capacitance line $CsL_n$ (along with every other adjacent auxiliary capacitance line) is driven by a lower auxiliary capacitance line driver circuit 700a at a predetermined potential different from the potential provided by the upper auxiliary capacitance line driver circuit 700b. In this manner, each single pixel formation portion is divided into two subpixel formation portions, the potentials of the auxiliary capacitance lines are caused to vary differently, as described above, to change their holding potentials, thereby achieving a wide viewing angle, and this configuration is well-known in the field of liquid crystal panels or suchlike for use in televisions, for example.

For the two types of auxiliary capacitance lines to which their respective different potentials are provided by the upper auxiliary capacitance line driver circuit 700b and the lower auxiliary capacitance line driver circuit 700a, as described above, two types of auxiliary capacitance trunk lines and two types of auxiliary capacitance branch lines are required. This characteristic feature will be described with reference to FIG. 15.

6.2 Layout Design of the Gate Driver and the Wiring

Figure 15:
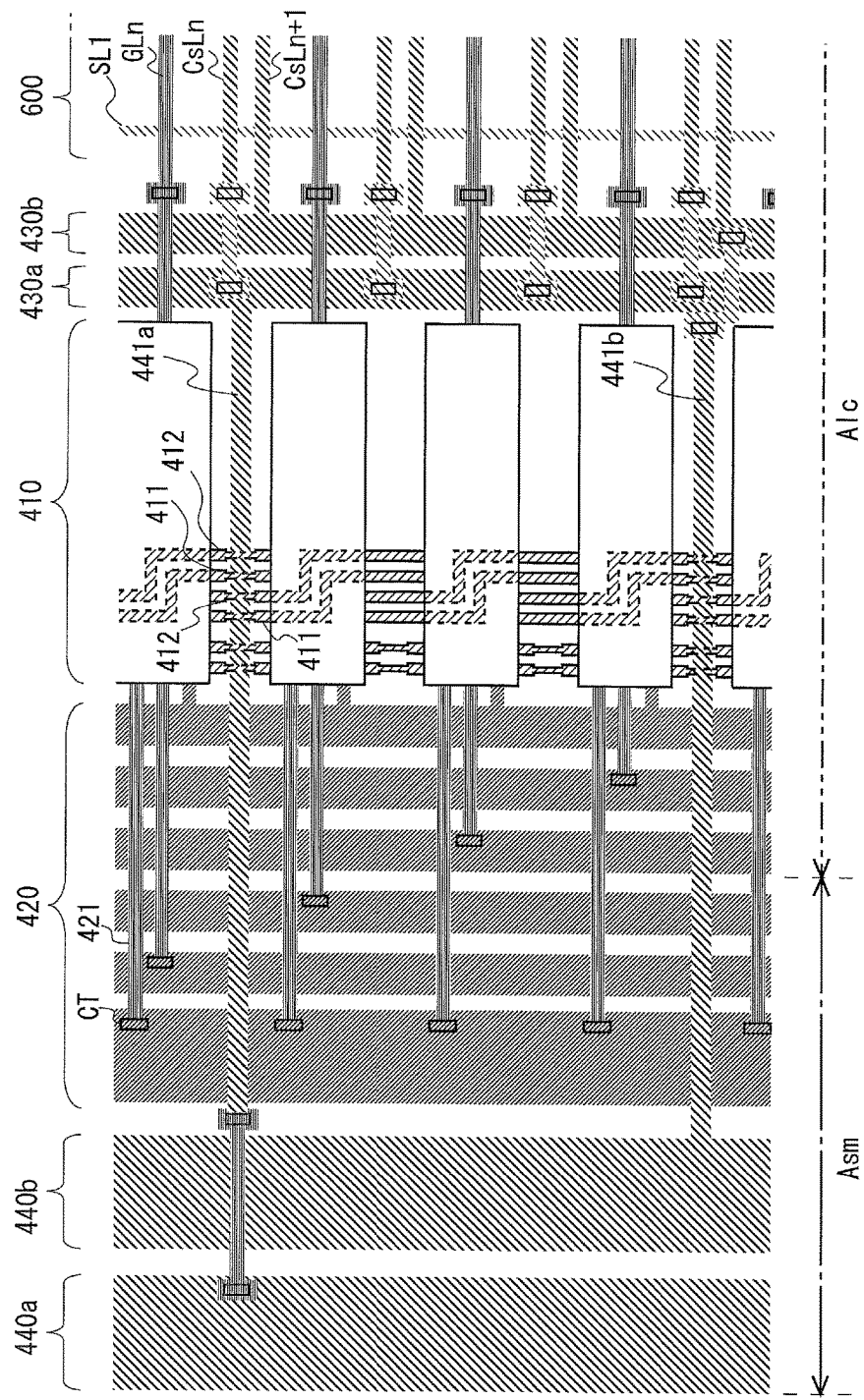
FIG. 15 is a diagram illustrating the layout design of a shift register and various wiring lines in the embodiment.

FIG. 15 is a diagram illustrating the layout design of the shift register 410 in the gate driver 400 and various wiring lines in the present embodiment. In FIG. 15, there are provided the shift register 410 composed of i bistable circuits, the second auxiliary capacitance trunk line 440, the intercircuit lines, etc., which are the same as those shown in FIG. 4 above, and there are also provided a first lower auxiliary capacitance trunk line 430a, a second lower auxiliary capacitance trunk line 440a, and a lower auxiliary capacitance branch line 441a for electrically connecting them, as well as a first upper auxiliary capacitance trunk line 430b, a second upper auxiliary capacitance trunk line 440b, and an upper auxiliary capacitance branch line 441b for electrically connecting them.

Here, as shown in FIG. 15, the first lower auxiliary capacitance trunk line 430a is electrically connected to lower auxiliary capacitance lines (including the auxiliary capacitance line $CsL_n$), which are the part of the auxiliary capacitance lines $CsL_1$ to $CsL_i$ that provides predetermined potentials to the lower pixel formation portions $P_a$, via branch lines arranged so as to extend over the first upper auxiliary capacitance trunk line 430b. Note that these branch lines are made of the same material as source bus lines $SL_1$ to $SL_j$.

In addition, the first lower auxiliary capacitance trunk line 430a is connected to and made of the same material as the lower auxiliary capacitance branch line 441a (i.e., the same material as the gate bus lines $G_1$ to $GL_i$), and the first lower auxiliary capacitance trunk line 430a is electrically connected to the lower auxiliary capacitance branch line 441a and the second lower auxiliary capacitance trunk line 440a via branch lines which are arranged so as to extend over the second upper auxiliary capacitance trunk line 440b. Note that these branch lines are made of the same material as the source bus lines $SL_1$ to $SL_j$.

Furthermore, the first upper auxiliary capacitance trunk line 430b is electrically connected to upper auxiliary capacitance lines (including the auxiliary capacitance line $CsL_{n+1}$), which are the part of the auxiliary capacitance lines $CsL_1$ to $CsL_i$ that provides predetermined potentials to the upper pixel formation portions $P_b$.

Further still, the second upper auxiliary capacitance trunk line 440b is connected to and made of the same material as the upper auxiliary capacitance branch line 441a (i.e., the same material as the gate bus lines $G_1$ to $GL_i$), and the second upper auxiliary capacitance trunk line 440b is electrically connected to the upper auxiliary capacitance branch line 441b and the first upper auxiliary capacitance trunk line 430b via branch lines which are arranged so as to extend over the first lower auxiliary capacitance trunk line 430a. Note that these branch lines are made of the same material as the source bus lines $SL_1$ to $SL_j$.

In this manner, the auxiliary capacitance lines, the first and second auxiliary capacitance trunk lines, and the auxiliary capacitance branch lines for connecting them are each provided in two types, so that potentials held in two subpixel formation portions included in each single pixel formation portion can be caused to vary differently, thereby making it possible to achieve a wide viewing angle for liquid crystal panels or suchlike for use in televisions, for example.

Note that in the present embodiment, the auxiliary capacitance lines, the auxiliary capacitance trunk lines, and the auxiliary capacitance branch lines are each provided in two types, but they may be provided in an appropriate number of types, such as four or eight types, in accordance with the number of subpixel formation portions to which different potentials are provided within each single pixel formation portion.

6.3 Effect

As described above, in the present embodiment, in addition to achieving each of the aforementioned effects of the first embodiment, the auxiliary capacitance lines, the auxiliary capacitance trunk lines, and the auxiliary capacitance branch lines are each provided in a plurality of types, so that potentials held in a plurality of subpixel formation portions included in each single pixel formation portion are caused to vary differently, thereby increasing the viewing angle of liquid crystal panels.

7. Variant of the Embodiments

In each of the embodiments, one or more first auxiliary capacitance trunk lines are provided, but they may be omitted with the second auxiliary capacitance trunk line being provided alone. In such a configuration, the positions of the bistable circuits included in the shift register can be moved away from the edge of the liquid crystal panel toward the display portion 600 (i.e., to the right in the figures) by a distance equivalent to the width of the area where the first auxiliary capacitance trunk line is provided, so that the extent of the part of the wiring area for providing signals to the shift register that is overlaid with a seal material can be further reduced without increasing the frame area and overlaying the shift register with the seal material, and furthermore, wiring corrosion in contact holes CT due to humidity can be prevented or reduced.

However, in the configuration of the variant, it is necessary to provide a predetermined potential to the auxiliary capacitance lines $CsL_i$ to $CsL_1$ by the second auxiliary capacitance trunk line alone, and therefore, if any one of the auxiliary capacitance branch lines 441 is cut (during the production process), it is not possible to provide the predetermined potential to the auxiliary capacitance lines $CsL_1$ to $CsL_1$ using the first auxiliary capacitance trunk line, resulting in a defective product and a reduced yield.

Furthermore, in the configuration of the variant, the second auxiliary capacitance trunk line alone might not be able to provide the predetermined potential uniformly to the auxiliary capacitance lines $CsL_1$ to $CsL_i$. The reason for this is as follows. Specifically, the auxiliary capacitance branch lines 441 are susceptible to potential variations due to parasitic capacitances, for example, at crossing points with intercircuit lines, as described above, and therefore, a uniform potential might not be provided. In addition, when compared to auxiliary capacitance lines connected in the vicinity of the end of the second auxiliary capacitance trunk line that is proximal to the power source, auxiliary capacitance lines connected in the vicinity of the distal end are prone to signal delays, and might be able to provide a uniform potential. In particular, in the case where the auxiliary capacitance lines are driven by alternating current, the signal delays might result in reduced display quality such as a phenomenon where shadowy images are displayed (referred to as a shadowing phenomenon). Accordingly, in the case where priority is given to a predetermined potential being uniformly provided to the auxiliary capacitance lines $CsL_1$ to $CsL_i$, the configurations of the embodiments are preferable.

Note that the embodiments are merely illustrative, and by appropriately combining their characteristic components or in combination with well-known different components, the present invention can be applied to diverse variants.

INDUSTRIAL APPLICABILITY

The present invention is applied to, for example, active-matrix liquid crystal display devices or suchlike, and is suitable for liquid crystal display devices in which shift registers included in scanning signal line driver circuits and various wiring lines are laid out in frame areas.

DESCRIPTION OF THE REFERENCE CHARACTERS 100 power source
200 display control circuit
300 source driver (video signal line driver circuit)
400 gate driver (scanning signal line driver circuit)
410, 413 shift register
411, 412 intercircuit line
420 drive-signal-supply trunk line group
421 drive-signal-supply branch line group
430 first auxiliary capacitance trunk line
440 second auxiliary capacitance trunk line
441 auxiliary capacitance branch line
451 end auxiliary capacitance line
500 common electrode driver circuit
600 display portion
CT contact hole
$V_{com}$ common potential
$SL_1$ to $SL_j$ source bus line
$GL_1$ to $GL_i$ gate bus line
$CsL_1$ to $CsL_i$ auxiliary capacitance line
GSP gate start pulse signal
GCK gate clock signal
$CK_1$ to $CK_4$ first to fourth gate clock signals

The invention claimed is:

1. An active-matrix liquid crystal display device comprising:
a first substrate including a display area in which pixel formation portions that produce an image to be displayed are arranged in a matrix;
a second substrate opposed to the first substrate; and
a liquid crystal layer sealed between the first and the second substrates by a seal material; wherein
the first substrate includes:
video signal lines to transmit signals to represent the image to be displayed;
scanning signal lines crossing the video signal lines;
auxiliary lines extending in parallel with the scanning signal lines and extending in the display area and outside the display area;
a scanning signal line driver circuit including a group of circuits to selectively drive the scanning signal lines, the group of circuits being arranged side-by-side in a direction perpendicular to a length of the scanning signal lines;
a first auxiliary trunk line electrically connected to the auxiliary lines, the first auxiliary trunk line including a first length portion extending perpendicular to the length of the scanning signal lines;
a second auxiliary trunk line electrically connected to the auxiliary lines, the second auxiliary trunk line including a second length portion extending perpendicular to the length of the scanning signal lines and located between the scanning signal line driver circuit and an edge of the first substrate that is opposite to the display area with respect to the scanning signal line driver circuit; and
an end auxiliary line that connects the first auxiliary trunk line and the second auxiliary trunk line, the end auxiliary line extending around the scanning signal line driver circuit either between a first end of the first auxiliary trunk line and a first end of the second auxiliary trunk line or between a second end of the first auxiliary trunk line and a second end of the second auxiliary trunk line, or both, and
the first length portion, the scanning signal line driver circuit, the second length portion, and the edge of the first substrate are in this order in an extending direction of the length of the scanning signal lines.

2. The liquid crystal display device according to claim 1, further comprising a drive-signal-supply trunk line to transmit a drive signal to drive the scanning signal line driver circuit, the drive-signal-supply trunk line extends in the direction perpendicular to the length of the scanning signal lines between the second auxiliary trunk line and the scanning signal line driver circuit, wherein
the seal material is in an area extending from a position near the edge of the first substrate to a predetermined position on the drive-signal-supply trunk line.

3. The liquid crystal display device according to claim 2, further comprising drive-signal-supply branch lines connected to the drive-signal-supply trunk line by contact holes to connect the drive-signal-supply trunk line to the group of circuits, wherein
the seal material is in the area extending from the position near the edge of the first substrate to a predetermined position over a portion of the contact holes.

4. The liquid crystal display device according to claim 3, wherein the contact holes include a same material as pixel electrodes in the pixel formation portions and connect the drive-signal-supply trunk line and the drive-signal-supply branch lines.

5. The liquid crystal display device according to claim 1, further comprising auxiliary branch lines between the first and the second auxiliary trunk lines, the auxiliary branch lines connecting the first and the second auxiliary trunk lines, wherein the auxiliary branch lines are at approximately equal intervals in the direction perpendicular to the auxiliary trunk lines such that each of the auxiliary branch lines passes between two circuits adjacent in the direction perpendicular to the auxiliary trunk lines within the group of circuits.

6. The liquid crystal display device according to claim 1, further comprising:
another first auxiliary trunk line; and
another second auxiliary trunk line, wherein
the scanning signal line driver circuit includes:
   a first group of circuits to selectively drive the scanning signal lines from one side; and
   a second group of circuits to selectively drive the scanning signal lines from another side,
the first auxiliary trunk line is between the first group of circuits and the display area, the another first auxiliary trunk line is between the second group of circuits and the display area, and
the second auxiliary trunk line is between the first group of circuits and an edge of the first substrate that is opposite to the display area with respect to the first group of circuits, the another second auxiliary trunk line is between the second group of circuits and an edge of the first substrate that is opposite to the display area with respect to the second group of circuits.

7. The liquid crystal display device according to claim 6, further comprising an end auxiliary line to connect the second auxiliary trunk lines on the one and the another sides, the end auxiliary line being positioned: between a first end of the second auxiliary trunk lines on the one side and a first end of the second auxiliary trunk lines on the another side, between a second end of the second auxiliary trunk line on the one side and a second end of the second auxiliary trunk line on the another side, or both.

8. The liquid crystal display device according to claim 1, wherein the second auxiliary trunk line includes a plurality of openings.

9. The liquid crystal display device according to claim 2, wherein,
the drive-signal-supply trunk line includes wiring lines, and
a wide wiring line out of the wiring lines on which the seal material is located includes a plurality of openings.

10. The liquid crystal display device according to claim 1, wherein,
the auxiliary lines are of a plurality of different types which are driven at different potentials,
a plurality of the first auxiliary trunk lines is a first type driven at a first potential, and
a plurality of the second auxiliary trunk lines is a second type driven at a second potential.

11. The liquid crystal display device according to claim 1, wherein the second auxiliary trunk line is wider than the first auxiliary trunk line.

12. The liquid crystal display device according to claim 1, wherein the first auxiliary trunk line includes a same material as the second auxiliary trunk line.

13. The liquid crystal display device according to claim 1, wherein the scanning signal line driver circuit includes:
   a first group of circuits to selectively drive the scanning signal lines from one side; and
   a second group of circuits to selectively drive the scanning signal lines from another side, wherein
   each of the scanning signal lines is driven by both the first group of circuits and the second group of circuits.

14. The liquid crystal display device according to claim 1, wherein the scanning signal line driver circuit includes:
   a first group of circuits to one side; and
   a second group of circuits to another side, wherein
   the scanning signal lines are alternately driven by the first group of circuits and the second group of circuits.

15. The liquid crystal display device according to claim 1, wherein the scanning signal line driver circuit is not overlaid with the seal material.

16. The liquid crystal display device according to claim 1, wherein a common transfer electrode is on the second auxiliary trunk line.

17. The liquid crystal display device according to claim 1, further comprising a drive-signal-supply trunk line to transmit a drive signal to drive the scanning signal line driver circuit, the drive-signal-supply trunk line including contact holes and a transparent electrode for connection, wherein
   the drive-signal-supply trunk line is nearer to the display area than the second auxiliary trunk line.

18. The liquid crystal display device according to claim 1, wherein an extending direction of the seal material is parallel to an extending direction of an edge of the first substrate.

19. The liquid crystal display device according to claim 1, wherein the end auxiliary line is not on any extending lines of the auxiliary lines.

* * * * *